US010000253B1

(12) United States Patent
Tetsuka et al.

(10) Patent No.: US 10,000,253 B1
(45) Date of Patent: Jun. 19, 2018

(54) BICYCLE CRANK ASSEMBLY

(71) Applicant: Shimano Inc., Sakai, Osaka (JP)

(72) Inventors: Toshio Tetsuka, Osaka (JP); Takashi Furuya, Osaka (JP); Shintaro Mori, Osaka (JP)

(73) Assignee: Shimano Inc., Osaka (JP)

( * ) Notice: Subject to any disclaimer, the term of this patent is extended or adjusted under 35 U.S.C. 154(b) by 0 days. days.

(21) Appl. No.: 15/361,332

(22) Filed: Nov. 25, 2016

(51) Int. Cl.
*B62M 3/00* (2006.01)
*F16B 23/00* (2006.01)
*B62M 1/36* (2013.01)
*B62M 25/08* (2006.01)

(52) U.S. Cl.
CPC ............... *B62M 3/00* (2013.01); *B62M 1/36* (2013.01); *B62M 25/08* (2013.01); *F16B 23/00* (2013.01)

(58) Field of Classification Search
CPC . B62M 1/36; B62M 1/38; B62M 3/00; B62M 25/06; B62M 25/08; B62J 2099/002; F16B 23/00; F16B 23/0007; F16B 23/0061; F16B 23/003; F16B 23/0069; G01L 5/225
See application file for complete search history.

(56) References Cited

U.S. PATENT DOCUMENTS

| 7,047,817 | B2   | 5/2006  | Lanham |            |
|-----------|------|---------|--------|------------|
| 7,080,574 | B2 * | 7/2006  | Chang  | B62M 3/00  |
|           |      |         |        | 403/4      |
| 7,152,501 | B2 * | 12/2006 | Yamanaka | B62M 3/00 |
|           |      |         |        | 74/594.1   |
| 7,340,976 | B2 * | 3/2008  | Tetsuka | B62M 25/02 |
|           |      |         |        | 188/2 D    |
| 7,527,277 | B2 * | 5/2009  | Nonoshita | B62M 3/00 |
|           |      |         |        | 280/259    |
| 7,856,903 | B2 * | 12/2010 | Yamanaka | B62M 3/00 |
|           |      |         |        | 74/594.1   |
| 7,861,599 | B2 * | 1/2011  | Meggiolan | G01L 3/108 |
|           |      |         |        | 73/760     |
| 7,975,561 | B1   | 7/2011  | Ambrosina et al. | |
| 8,006,574 | B2   | 8/2011  | Meyer  |            |
| 8,065,926 | B2   | 11/2011 | Meyer  |            |
| 8,206,071 | B1 * | 6/2012  | Johnson | B25B 13/065 |
|           |      |         |        | 411/178    |
| 8,505,393 | B2   | 8/2013  | Meyer  |            |

(Continued)

FOREIGN PATENT DOCUMENTS

WO  2011/030215 A1  3/2011
WO  2012/056510 A1  5/2012

(Continued)

*Primary Examiner* — Adam D Rogers
(74) *Attorney, Agent, or Firm* — Global IP Counselors, LLP

(57) ABSTRACT

A crank arm fixing ring is basically provided with a cylindrical mounting portion and a contact portion. The cylindrical mounting portion includes an external thread configured to screw into a crankshaft. The contact portion extends radially outwardly from the cylindrical mounting portion. The contact portion is configured to contact a crank arm upon attachment of the crank arm with the crank arm fixing ring. The contact portion includes at least one cutout extending radially outwardly from the cylindrical mounting portion. The at least one cutout is configured to receive a transmission line extending through the cylindrical mounting portion.

19 Claims, 14 Drawing Sheets

(56) References Cited

U.S. PATENT DOCUMENTS

| | | | |
|---|---|---|---|
| 8,677,859 B2* | 3/2014 | Yamanaka | B62M 3/00 |
| | | | 74/594.1 |
| 8,881,608 B2 | 11/2014 | Tetsuka et al. | |
| 9,423,310 B2* | 8/2016 | Tetsuka | G01L 5/13 |
| 9,475,545 B2* | 10/2016 | Yamanaka | B62M 3/00 |
| 9,580,138 B2* | 2/2017 | Tetsuka | B62M 3/16 |
| 9,581,508 B2* | 2/2017 | Tetsuka | G01L 5/161 |
| 9,771,126 B2* | 9/2017 | Tetsuka | B62M 3/00 |
| 9,802,297 B2* | 10/2017 | Marchand | B25B 13/50 |
| 2005/0178236 A1* | 8/2005 | Crozet | B62K 19/16 |
| | | | 74/594.1 |
| 2008/0236293 A1 | 10/2008 | Meggiolan | |
| 2010/0263468 A1 | 10/2010 | Fisher et al. | |
| 2012/0214646 A1 | 8/2012 | Lull et al. | |
| 2012/0312130 A1* | 12/2012 | Bauer | B25B 13/065 |
| | | | 81/461 |
| 2012/0330572 A1 | 12/2012 | Longman | |
| 2013/0019700 A1 | 1/2013 | Matsumoto | |
| 2013/0104650 A1 | 5/2013 | Bailey et al. | |
| 2013/0205916 A1 | 8/2013 | Kodama et al. | |
| 2013/0210583 A1 | 8/2013 | Kametani et al. | |
| 2014/0060212 A1 | 3/2014 | Tetsuka et al. | |
| 2015/0240858 A1* | 8/2015 | Bertovic | B25B 13/50 |
| | | | 411/388 |
| 2016/0216169 A1 | 7/2016 | Tetsuka et al. | |
| 2017/0247078 A1* | 8/2017 | Tetsuka | B62M 3/16 |
| 2017/0274960 A1* | 9/2017 | Dubois | B62M 3/00 |

FOREIGN PATENT DOCUMENTS

| | | |
|---|---|---|
| WO | 2012/056522 A1 | 5/2012 |
| WO | 2013/017465 A2 | 2/2013 |
| WO | 2015/095933 A1 | 7/2015 |

\* cited by examiner

BICYCLE CRANK ASSEMBLY

BACKGROUND

Field of the Invention

This invention generally relates to a crank arm fixing ring. More specifically, the present invention relates to a crank arm fixing ring for attaching a crank arm to a crankshaft, and a bicycle crank assembly having a crank arm attached to a crankshaft by the crank arm fixing ring.

Background Information

Most bicycles have a drive train that uses a chain to transmit the pedaling action from the rider to the rear wheel. A bicycle drive train typically has one or more front sprockets provided on a bicycle crank assembly of the bicycle and one or more rear sprockets provided on a rear hub of the bicycle. The chain wraps around the front and rear sprockets. Thus, rotation of the bicycle crank assembly by the rider is transmitted to the rear wheel by the chain, which meshes with the front and rear sprockets.

Recently, some bicycles are equipped with various sensors for providing information to a rider and/or for providing information to a controller to control various aspects of the bicycle, such as shifting or suspension stiffness. For example, pedaling force detectors typically use strain gauges to measure pedaling force during pedaling. Some pedaling force detectors are arranged to have sensor circuits and disposed on a crank assembly, as disclosed in U.S. Patent Application Publication No. 2014/0060212 (assigned to Shimano). Sensor circuits may be configured to process pedaling force information detected by the strain gauges and transmit this information so that it is received by the rider.

SUMMARY

Generally, the present disclosure is directed to various features of a crank arm fixing ring used to attach a crank arm to a crankshaft, and a bicycle crank assembly having a crank arm attached to a crankshaft by the crank arm fixing ring.

In view of the state of the known technology and in accordance with a first aspect of the present disclosure, a crank arm fixing ring is provided that basically comprises a cylindrical mounting portion and a contact portion. The cylindrical mounting portion includes an external thread configured to screw into a crankshaft. The contact portion extends radially outwardly from the cylindrical mounting portion. The contact portion is configured to contact a crank arm upon attachment of the crank arm with the crank arm fixing ring. The contact portion includes at least one cutout extending radially outwardly from the cylindrical mounting portion. The at least one cutout is configured to receive a transmission line extending through the cylindrical mounting portion.

Advantageously according to the first aspect of the present invention, the crank arm fixing ring is configured such that a transmission line can be routed from a crank arm into an interior space of a crankshaft.

In accordance with a second aspect of the present invention, the crank arm fixing ring according to the first aspect is configured so that the at least one cutout of the contact portion includes a plurality of the cutouts.

Advantageously according to the second aspect of the present invention, by providing a plurality of the cutouts, the crank arm fixing ring is configured such that the crank arm fixing ring can be installed with different orientation for routing a transmission line from a crank arm into an interior space of a crankshaft.

In accordance with a third aspect of the present invention, the crank arm fixing ring according to the second aspect is configured so that the cutouts are arranged to define a plurality of tool engagement protrusions.

Advantageously according to the third aspect of the present invention, the crank arm fixing ring can be easily installed using the cutouts as tool engagement protrusions.

In accordance with a fourth aspect of the present invention, the crank arm fixing ring according to the third aspect is configured so that the tool engagement protrusions are equally spaced apart in a circumferential direction.

Advantageously according to the fourth aspect of the present invention, the crank arm fixing ring can be evenly screwed into the crankshaft.

In accordance with a fifth aspect of the present invention, the crank arm fixing ring according to the third aspect is configured so that at least two of the tool engagement protrusions are diametrically disposed.

Advantageously according to the fifth aspect of the present invention, the crank arm fixing ring can be evenly screwed into the crankshaft.

In accordance with a sixth aspect of the present invention, the crank arm fixing ring according to any one of the first to fifth aspects is configured so that the cylindrical mounting portion and the contact portion are integrally formed as a one-piece member.

Advantageously according to the sixth aspect of the present invention, the crank arm fixing ring can be relatively easy to manufacture.

In accordance with a seventh aspect of the present invention, the crank arm fixing ring according to any one of the first to sixth aspects is configured so that the cylindrical mounting portion and the contact portion are made of a metallic material.

Advantageously according to the seventh aspect of the present invention, the crank arm fixing ring can be relatively durable and inexpensive to manufacture.

In accordance with an eighth aspect of the present invention, the crank arm fixing ring according to any one of the first to seventh aspects is configured so that the cylindrical mounting portion and the contact portion are made of a non-metallic material.

Advantageously according to the eighth aspect of the present invention, the crank arm fixing ring can be relatively lightweight.

In accordance with a ninth aspect of the present invention, a bicycle crank assembly is provided that basically comprises a crankshaft, a crank arm and a crank arm fixing ring. The crankshaft has a first end portion and a second end portion. The second end portion has an opening with an internal thread and an interior space communicating with the opening. The crank arm includes a crankshaft receiving opening with the second end portion of the crankshaft disposed in the crankshaft receiving opening. The crank arm fixing ring secures the crank arm to the second end portion of the crankshaft. The crank arm fixing ring comprises a cylindrical mounting portion and a contact portion. The cylindrical mounting portion includes an external thread screwed into an internal thread of the crankshaft. The contact portion contacts the crank arm. The contact portion includes at least one cutout extending radially outwardly from the cylindrical mounting portion.

Advantageously according to the ninth aspect of the present invention, the bicycle crank assembly is configured such that a transmission line can be routed from the crank arm into the interior space of the crankshaft.

In accordance with a tenth aspect of the present invention, the bicycle crank assembly according to the ninth aspect further comprises a first electrical unit and a second electrical unit. The first electrical unit is disposed in the interior space of the crankshaft. The second electrical unit is disposed on the crank arm. The first electrical unit is electrically connected to the second electrical unit by a transmission line extending into the cylindrical mounting portion of the crank arm fixing ring and out of the cylindrical mounting portion of the crank arm fixing ring via the at least one cutout.

Advantageously according to the tenth aspect of the present invention, the bicycle crank assembly is configured such that the first and second electrical units can be conveniently located.

In accordance with an eleventh aspect of the present invention, the bicycle crank assembly according to the tenth aspect is configured so that the crank arm has an internal cavity and the transmission line extends into the internal cavity of the crank arm.

Advantageously according to the eleventh aspect of the present invention, the bicycle crank assembly is configured such that the transmission line can be concealed.

In accordance with a twelfth aspect of the present invention, the bicycle crank assembly according to the eleventh aspect is configured so that the crank arm has a bore extending from the internal cavity to the crankshaft receiving opening. The transmission line extends through the bore.

Advantageously according to the twelfth aspect of the present invention, the bicycle crank assembly is further configured such that the transmission line can be concealed.

In accordance with a thirteenth aspect of the present invention, the bicycle crank assembly according to the twelfth aspect further comprises an outer cap disposed in the crankshaft receiving opening and concealing the crank arm fixing ring and a portion of the transmission line extending out of the bore and into an area of the crankshaft receiving opening.

Advantageously according to the thirteenth aspect of the present invention, the bicycle crank assembly is further configured such that the crank arm has an attractive appearance.

In accordance with a fourteenth aspect of the present invention, the bicycle crank assembly according to any one of the ninth to thirteenth aspects further comprises an additional crank arm secured to the first end portion of the crankshaft.

Advantageously according to the fourteenth aspect of the present invention, by providing the bicycle crank assembly with the additional crank arm, the crank arms can be optimally configured to match each other.

In accordance with a fifteenth aspect of the present invention, the bicycle crank assembly according to the fourteenth aspect is configured so that the additional crank arm includes a sprocket mounting structure with at least one sprocket mounted on the sprocket mounting structure.

Advantageously according to the fifteenth aspect of the present invention, by providing the bicycle crank assembly with the sprocket mounting structure, one or more sprockets can be easily mounted to the additional crank arm.

In accordance with a sixteenth aspect of the present invention, the bicycle crank assembly according to any one of the ninth to fifteenth aspects is configured so that the at least one cutout of the contact portion includes a plurality of the cutouts.

Advantageously according to the sixteenth aspect of the present invention, by providing a plurality of the cutouts, the crank arm fixing ring of the bicycle crank assembly is configured such that the crank arm fixing ring can be installed with different orientation for routing a transmission line from the crank arm into the interior space of the crankshaft.

In accordance with a seventeenth aspect of the present invention, the bicycle crank assembly according to the sixteenth aspect is configured so that the cutouts are arranged to define a plurality of tool engagement protrusions.

Advantageously according to the seventeenth aspect of the present invention, the crank arm fixing ring of the bicycle crank assembly can be easily installed using the cutouts as tool engagement protrusions.

In accordance with an eighteenth aspect of the present invention, the bicycle crank assembly according to the seventeenth aspect is configured so that the tool engagement protrusions are equally spaced apart in a circumferential direction.

Advantageously according to the eighteenth aspect of the present invention, the crank arm fixing ring of the bicycle crank assembly can be evenly screwed into the crankshaft.

In accordance with a nineteenth aspect of the present invention, the bicycle crank assembly according to any one of the ninth to eighteenth aspects is configured so that the cylindrical mounting portion and the contact portion are integrally formed as a one-piece member.

Advantageously according to the nineteenth aspect of the present invention, the crank arm fixing ring of the bicycle crank assembly can be relatively easy to manufacture.

Also other objects, features, aspects and advantages of the disclosed crank arm fixing ring will become apparent to those skilled in the art from the following detailed description, which, taken in conjunction with the annexed drawings, discloses one embodiment of the crank arm fixing ring which can be used with various bicycle crank assemblies for attaching a crank arm to a crankshaft.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
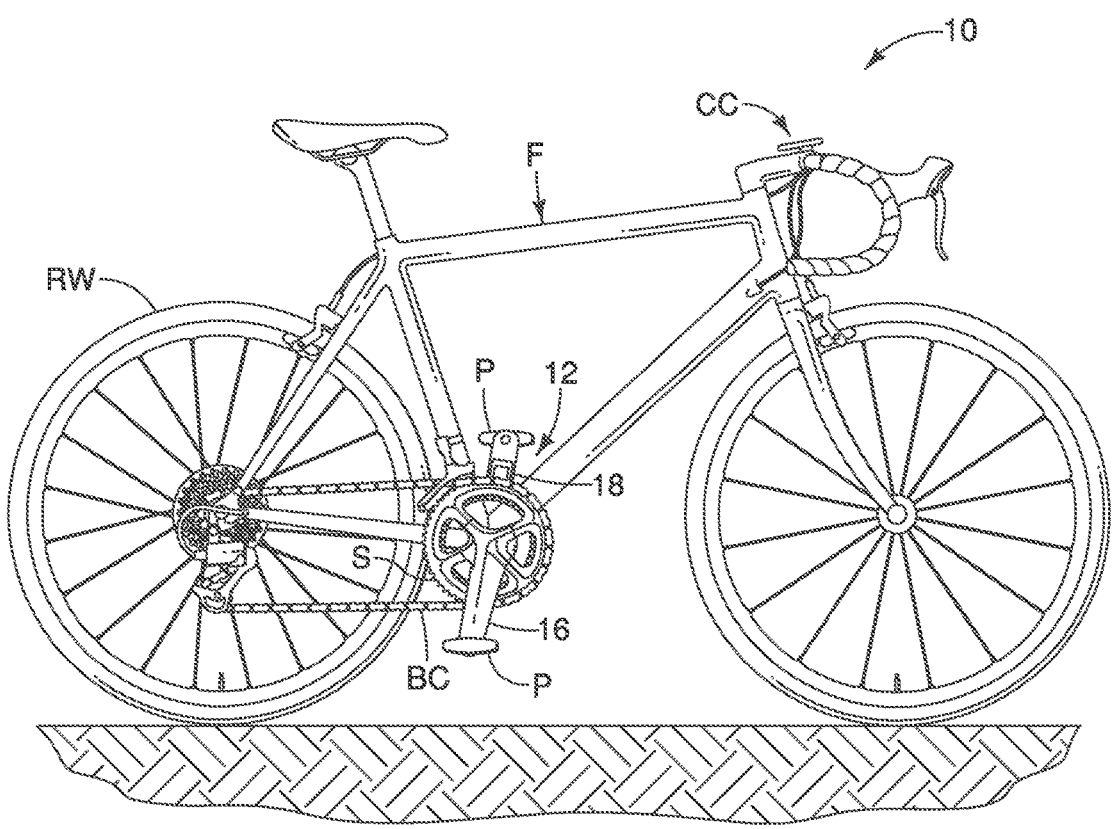
FIG. 1 is a side elevational view of a bicycle that is equipped with a bicycle crank assembly in accordance with a first illustrated embodiment.

Referring initially to FIG. 1, a bicycle 10 is illustrated that is equipped with a bicycle crank assembly 12 in accordance with a first embodiment. The bicycle crank assembly 12 is rotatably mounted to a bicycle frame F of the bicycle 10 in a conventional manner. As shown in FIG. 1, the bicycle 10 is a road style bicycle that includes various electrically-controlled components. Here, the bicycle 10 has a chain drive that has a bicycle chain BC for driving the rear wheel RW. In particular, the bicycle crank assembly 12 is provided with two bicycle sprockets S1 and S2 and a pair of bicycle pedals P. When a rider applies a pedaling force on the bicycle pedals P, a pedaling force is transmitted to the bicycle crank assembly 12, which rotate the bicycle sprockets S1 and S2 to move the bicycle chain BC and propel the bicycle 10 in a conventional manner. The bicycle 10 can be a mountain style bicycle or city style bicycle.

Figure 2:
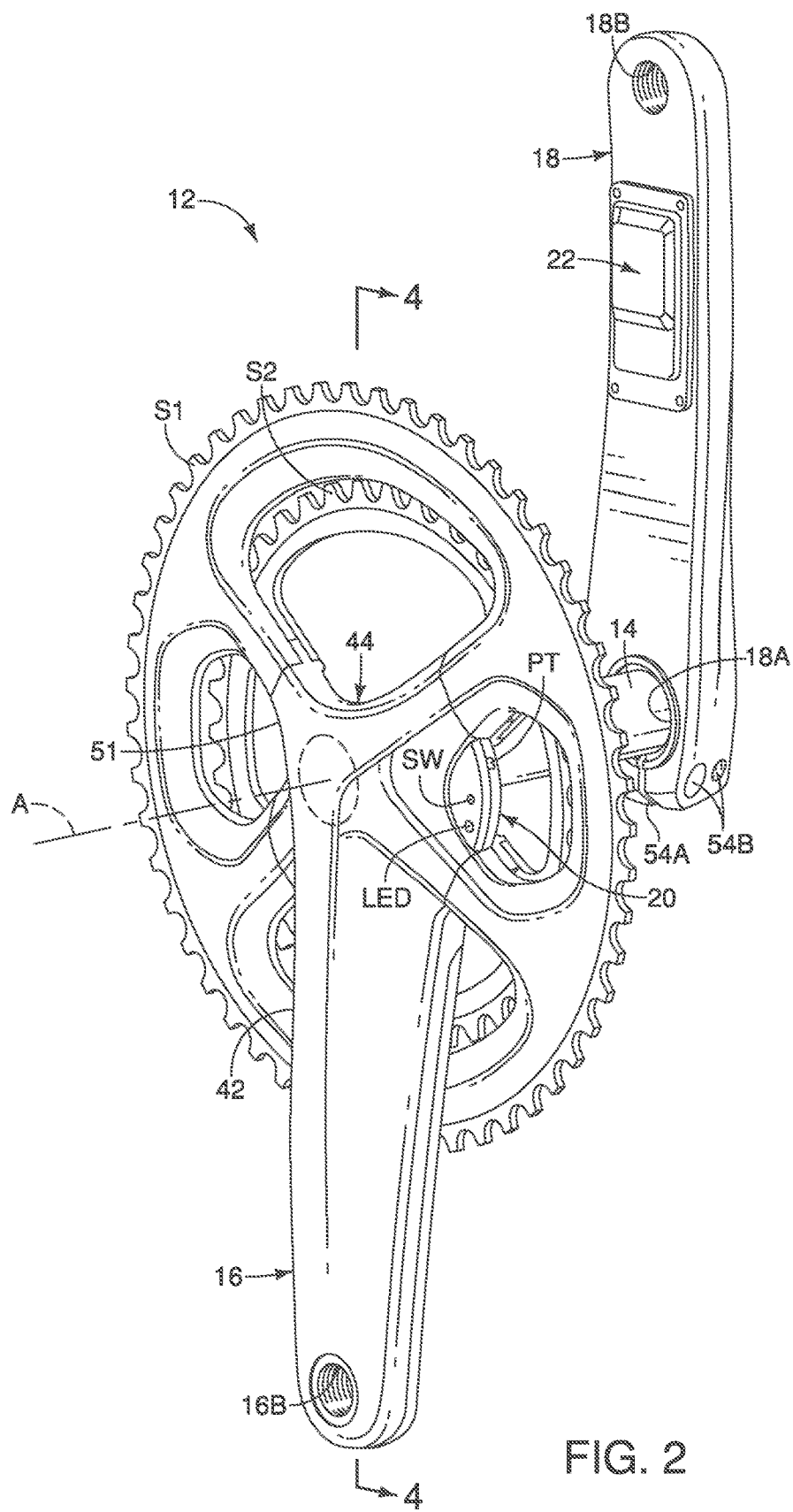
FIG. 2 is a perspective view of the bicycle crank assembly illustrated in FIG. 1 showing a pair of crank anus attached to a crankshaft.
Figure 3:
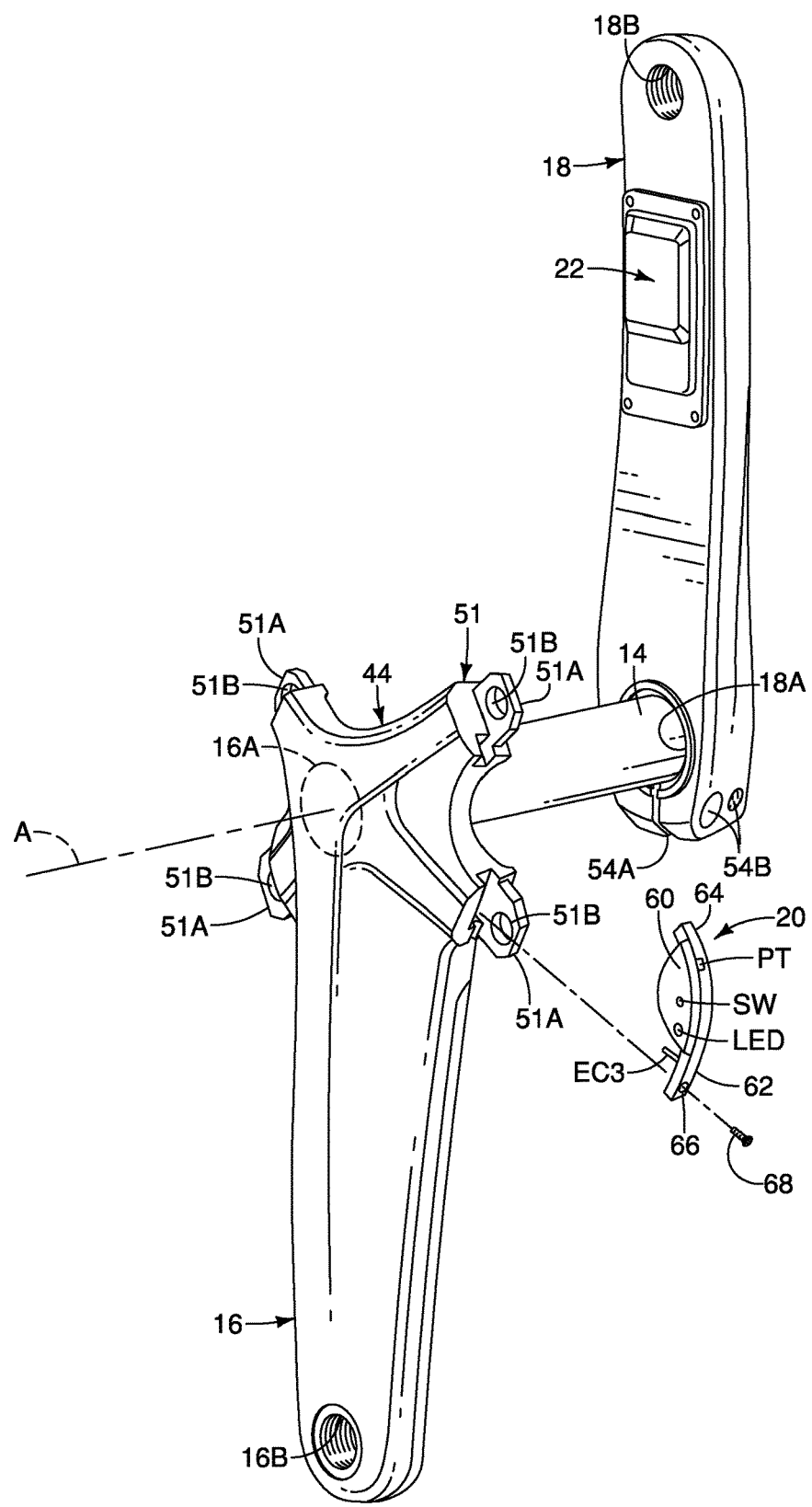
FIG. 3 is an outside elevational view of the bicycle crank arm assembly illustrated in FIGS. 1 and 2 with the sprockets removed and a wireless communication unit exploded from the sprocket mounting portion of the right crank arm.

As shown in FIGS. 2 and 3, the bicycle crank assembly 12 basically includes a crankshaft 14, a right or first crank arm 16 and a left or second crank arm 18. The crankshaft 14 has a first end portion 14A and a second end portion 14B. The crankshaft 14 has an interior space 14C extending between the first and second end portions 14A and 14B. Basically, the first and second crank arms 16 and 18 are fixedly coupled to the crankshaft 14 such that the first and second crank arms 16 and 18 extend perpendicularly from the crankshaft 14 in opposite directions. Specifically, the first crank arm 16 has a crankshaft receiving opening 16A which non-rotatably mates with the first end portion 14A of the crankshaft 14. For example, as shown, the crankshaft receiving opening 16A has a plurality of axially extending splines that mates with a plurality of axially extending splines of the first end portion 14A of the crankshaft 14. In the first embodiment, the first crank arm 16 is non-removably attached to the first end portion 14A of the crankshaft 14 by a suitable fastening technique such as crimping, adhesive, press fitting, etc. The second crank arm 18 includes a crankshaft receiving opening 18A with the second end portion 14B of the crankshaft 14 disposed in the crankshaft receiving opening 18A. The crankshaft receiving opening 18A non-rotatably mates with the second end portion 14B of the crankshaft 14. For example, as shown, the crankshaft receiving opening 18A has a plurality of axially extending splines that mates with a plurality of axially extending splines of the second end portion 14B of the crankshaft 14.

Here, the bicycle crank assembly 12 basically comprises a crank arm (e.g., the second crank arm 18) that is secured to the second end portion 14B of the crankshaft 14, and the bicycle crank assembly 12 further comprises an additional crank arm (e.g., the first crank arm 18) that is secured to the first end portion 14A of the crankshaft 14. However, the bicycle crank assembly 12 does not need to be sold with both crank arms. Rather, broadly speaking, the bicycle crank assembly 12 comprises a crankshaft, a crank arm and a crank arm fixing ring (not shown in FIGS. 2 and 3, but discussed below). As seen in FIG. 2, the bicycle sprockets S1 and S2 are mounted on to the first crank arm 16 for driving the bicycle chain BC. Only one sprocket can be mounted on the first crank arm 16.

Figure 4:
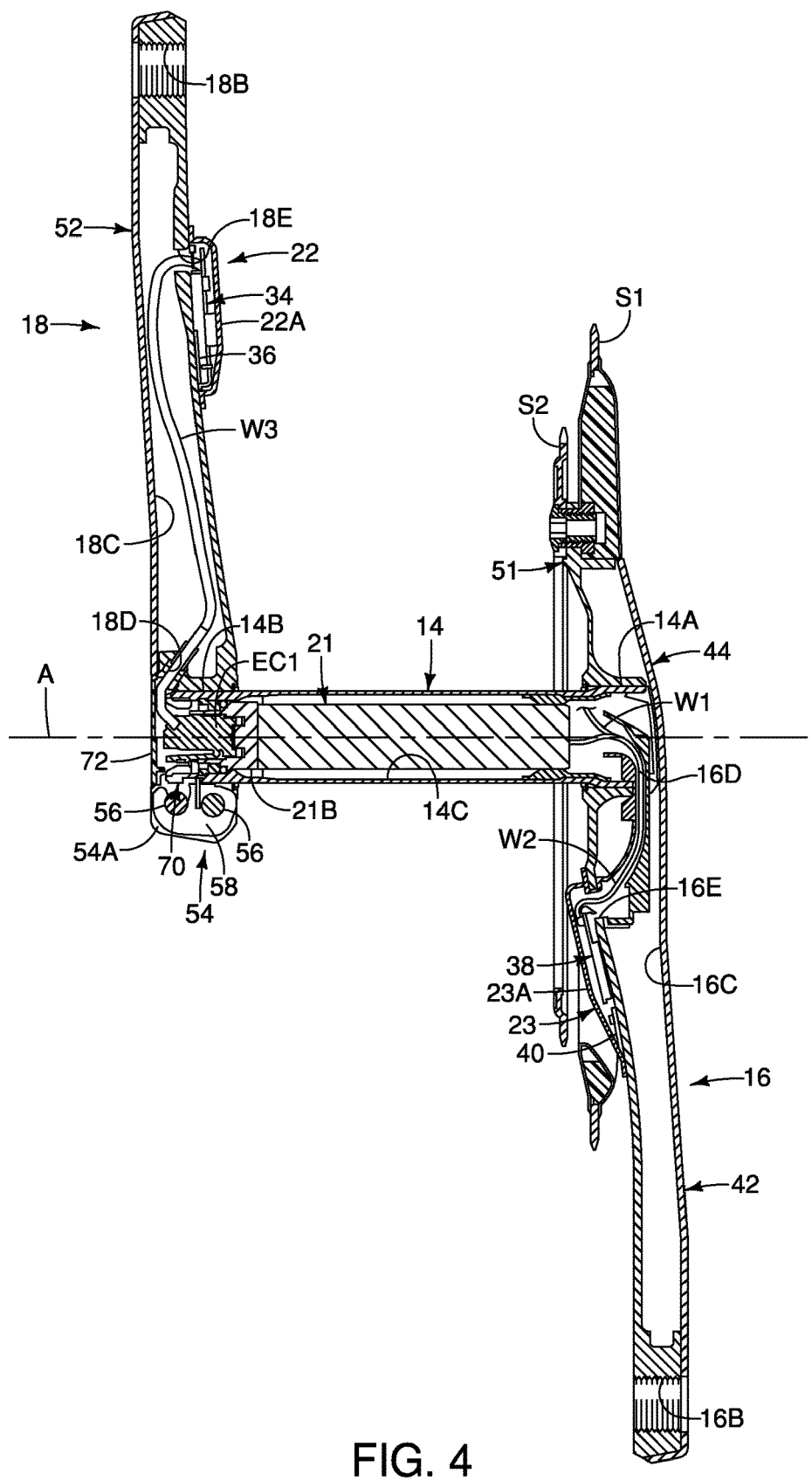
FIG. 4 is a cross-sectional view of the bicycle crank assembly illustrated in FIGS. 1 to 3 as seen along section line 4-4 of FIG. 2 in which a battery unit disposed in the crankshaft, a first electrical component attached to the left crank arm, a second electrical component attached to the right crank arm and the wireless communication unit attached to the right crank arm.

The second crank arm 18 is attached to the second end portion 14B of the crankshaft 14 in a releasable and reinstallable manner. As seen in FIGS. 3 and 4, the crankshaft receiving openings 16A and 18A have their centers located on a longitudinal center axis of the crankshaft 14 which defines a rotational axis or crank axis A of the bicycle crank assembly 12. The free ends of the first and second crank arms 16 and 18 are each provided with a bicycle pedal P. In particular, as best seen in FIG. 2, the first crank arm 16 has a threaded opening 16B for attaching one of the bicycle pedals P (FIG. 1) in a conventional manner. Likewise, the second crank arm 18 has a threaded opening 18B for attaching another bicycle pedal P. When a rider applies a pedaling force on the bicycle pedals P, a pedaling force is transmitted to the first and second crank arms 16 and 18, which rotate the bicycle sprockets S1 and S2 to move the bicycle chain BC and propel the bicycle 10 in a conventional manner.

Figure 5:
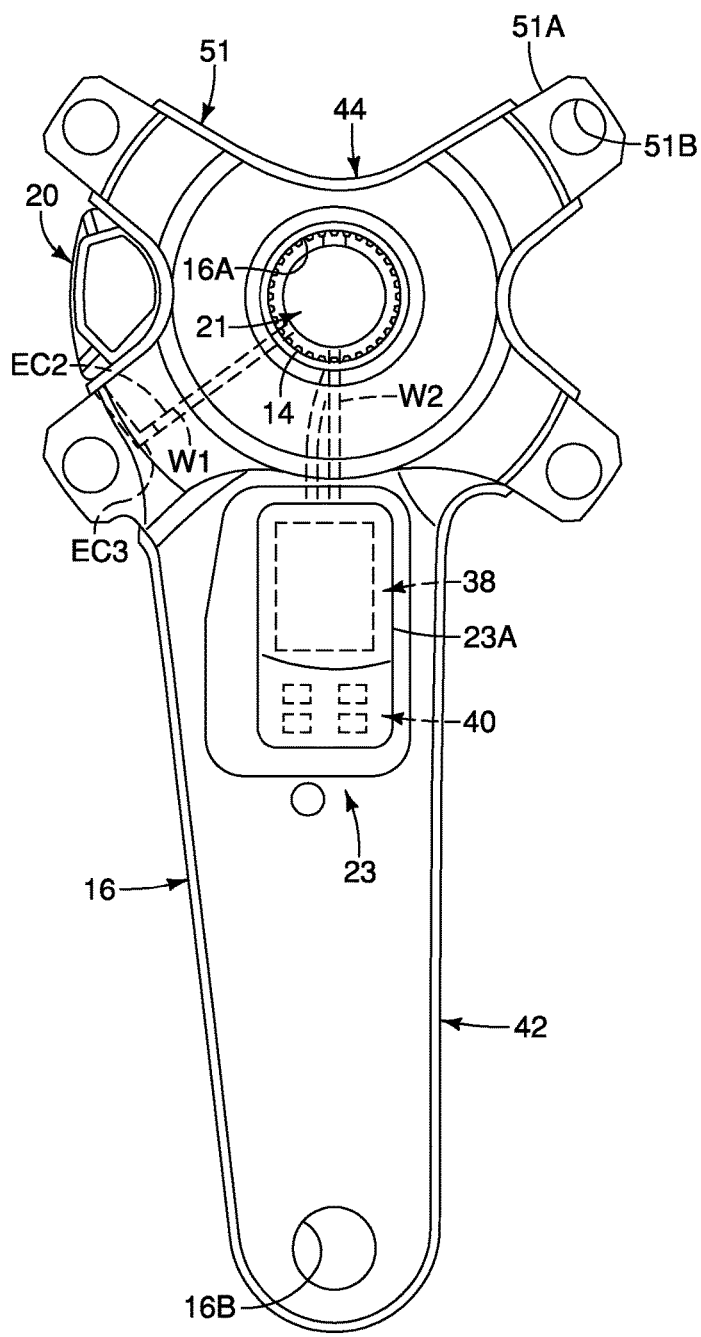
FIG. 5 is an inside elevational view of the right crank arm of the bicycle crank assembly illustrated in FIGS. 1 to 4.
Figure 6:
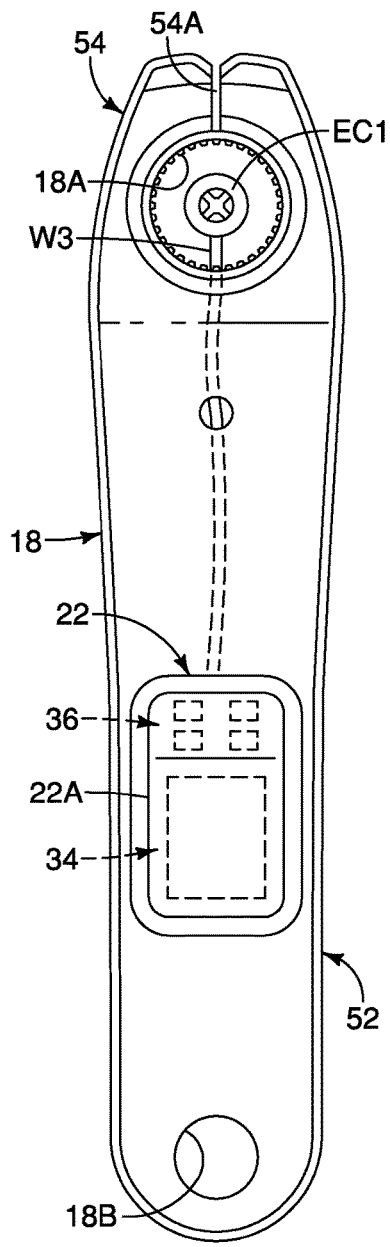
FIG. 6 is an inside elevational view of the left crank arm of the bicycle crank assembly illustrated in FIGS. 1 to 4.
Figure 7:
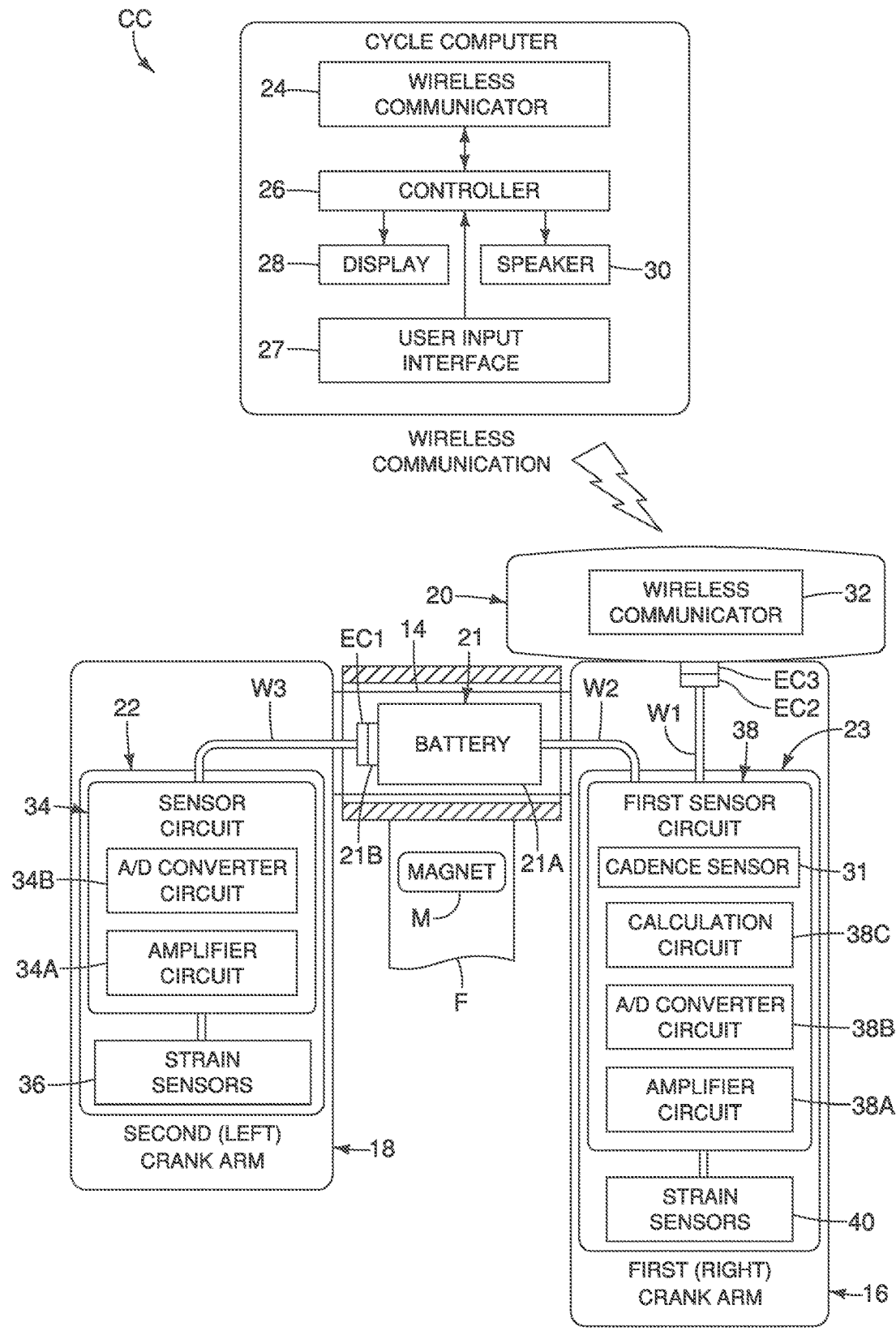
FIG. 7 is a block diagram of an electrical communication system in which the wireless communication unit of the right crank arm wirelessly communicated with a cycle computer.
Figure 8:
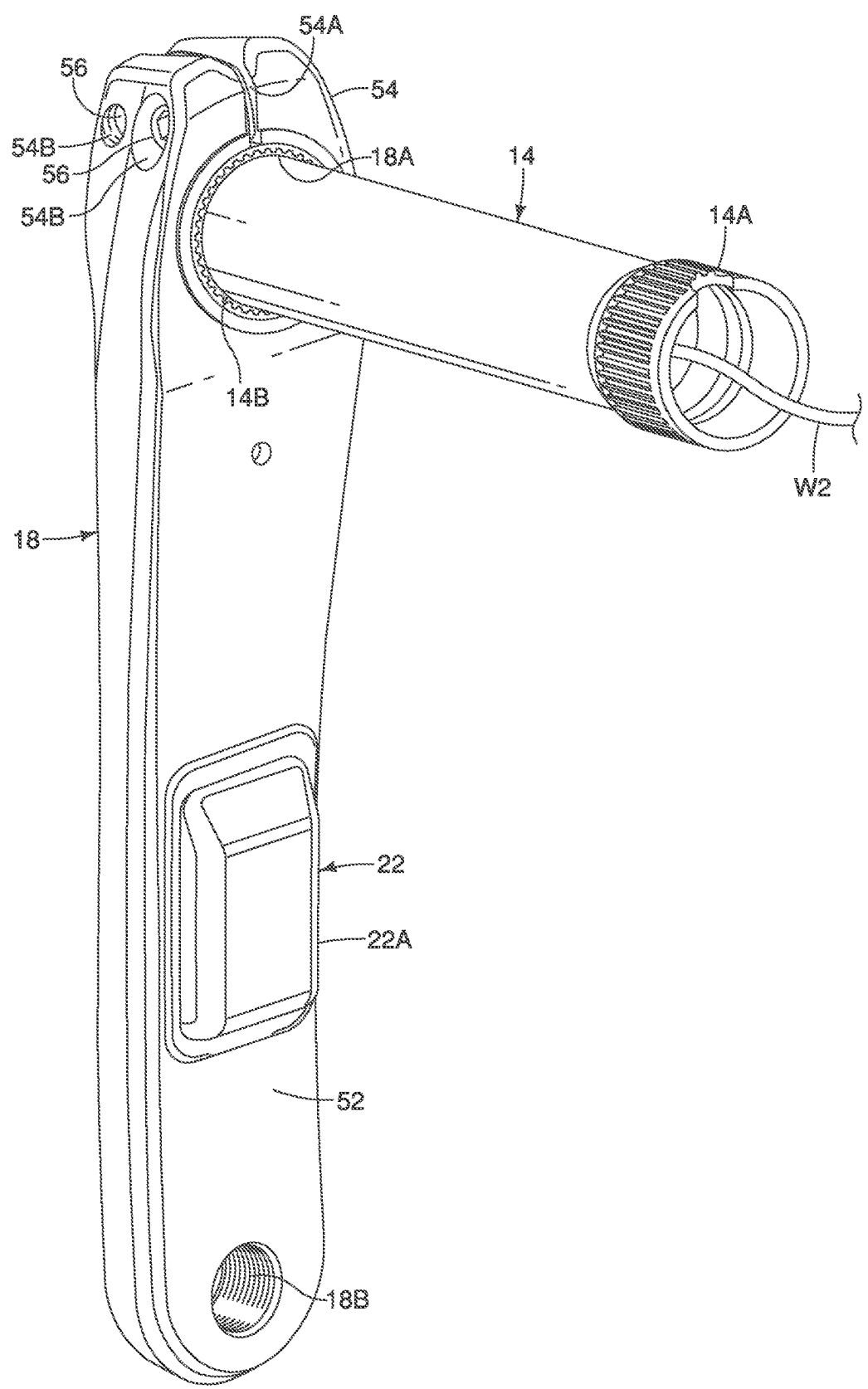
FIG. 8 is an inside perspective view of the left crank arm and the crankshaft of the bicycle crank assembly illustrated in FIGS. 1 to 4.
Figure 9:
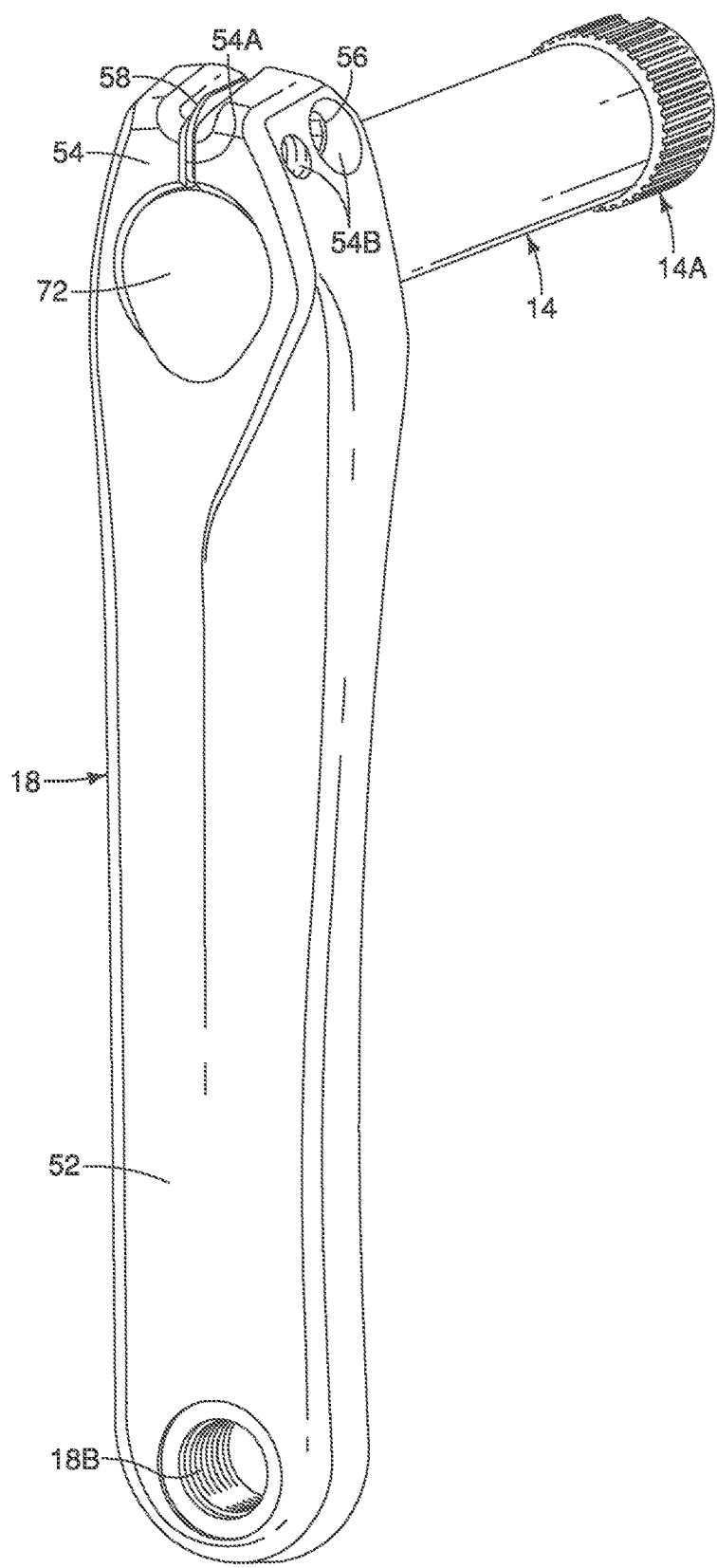
FIG. 9 is an outside perspective view of the left crank arm and the crankshaft illustrated ire FIG. 8.
Figure 10:
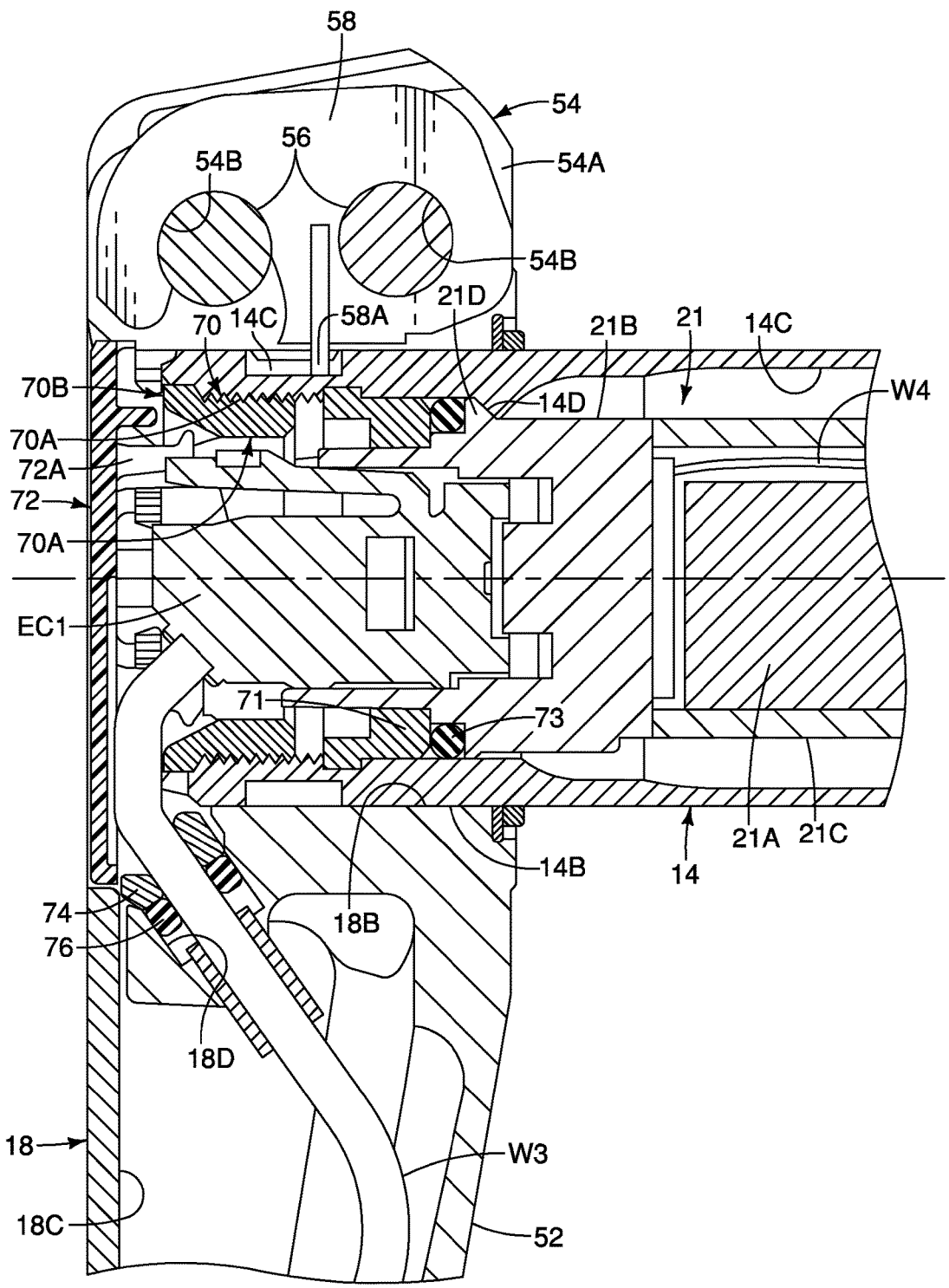
FIG. 10 is an enlarged cross-sectional view of the crankshaft mounting portion of the left crank arm with the crankshaft attached to the left crank arm by the crank arm fixing ring.
Figure 11:
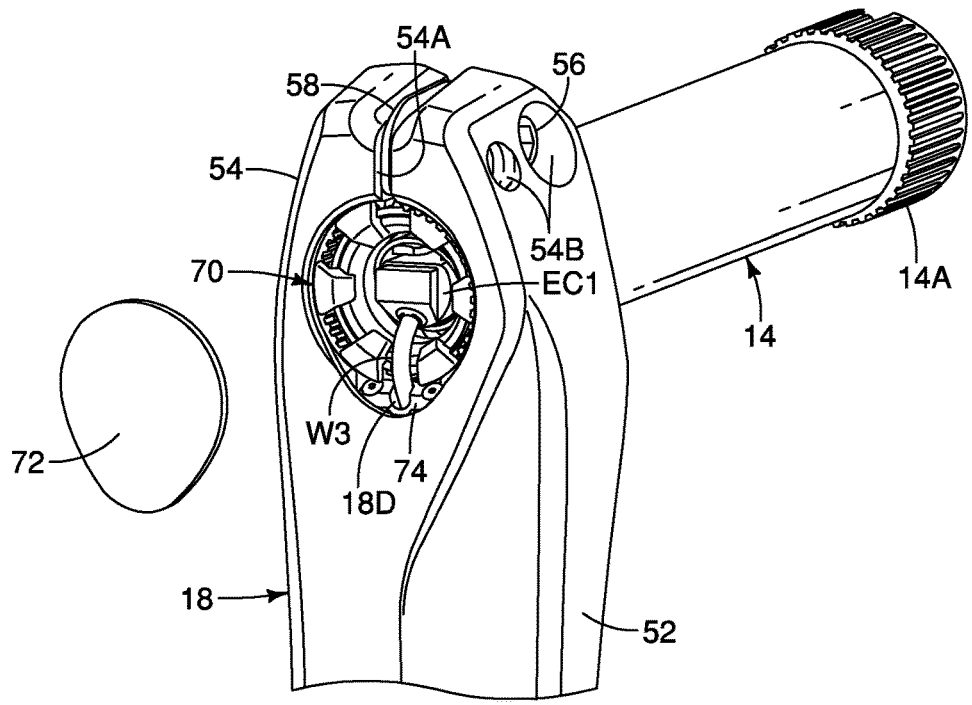
FIG. 11 is an outside perspective view of a crankshaft mounting portion of the left crank arm and the crankshaft illustrated in FIGS. 8 to 10 with an outer cap exploded away from the crankshaft mounting portion of the left crank arm.
Figure 12:
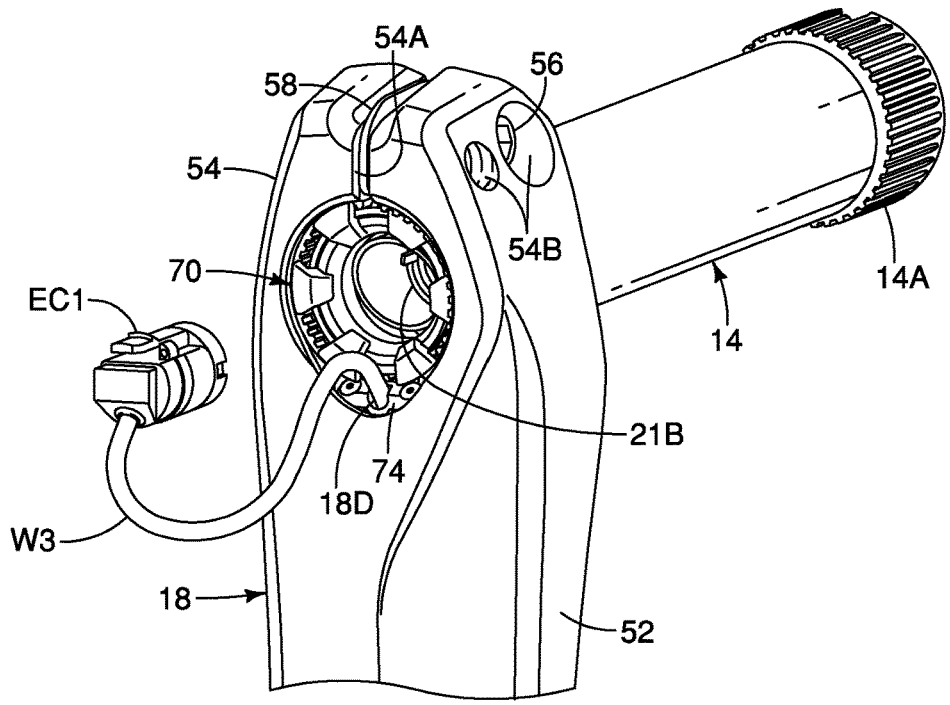
FIG. 12 is an outside perspective view, similar to FIG. 11, of the crankshaft mounting portion of the left crank arm and the crankshaft with the electrical connector detached from the battery unit.
Figure 13:
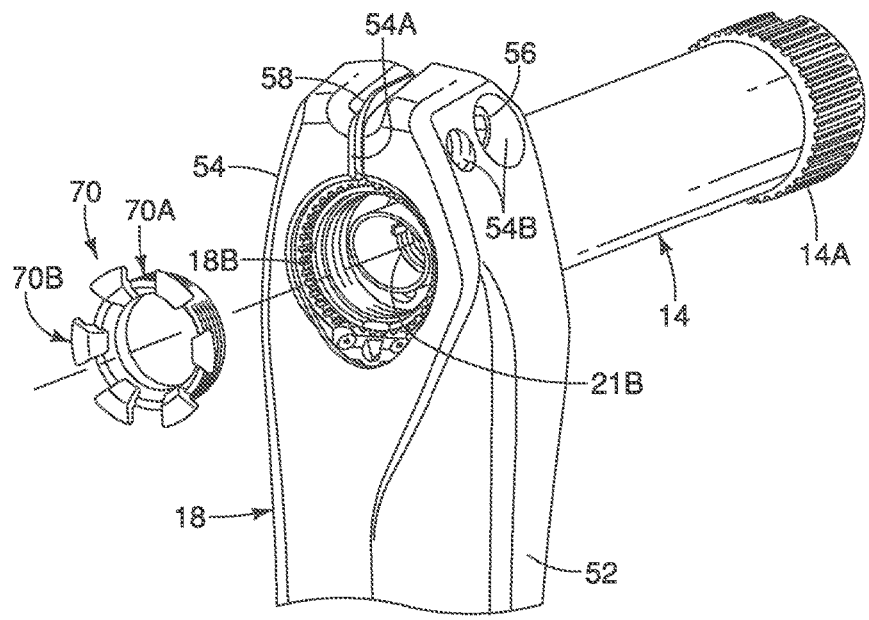
FIG. 13 is an outside perspective view, similar to FIGS. 11 and 12, of the crankshaft mounting portion of the left crank arm and the crankshaft with the crank arm fixing ring detached from the crankshaft.
Figure 14:
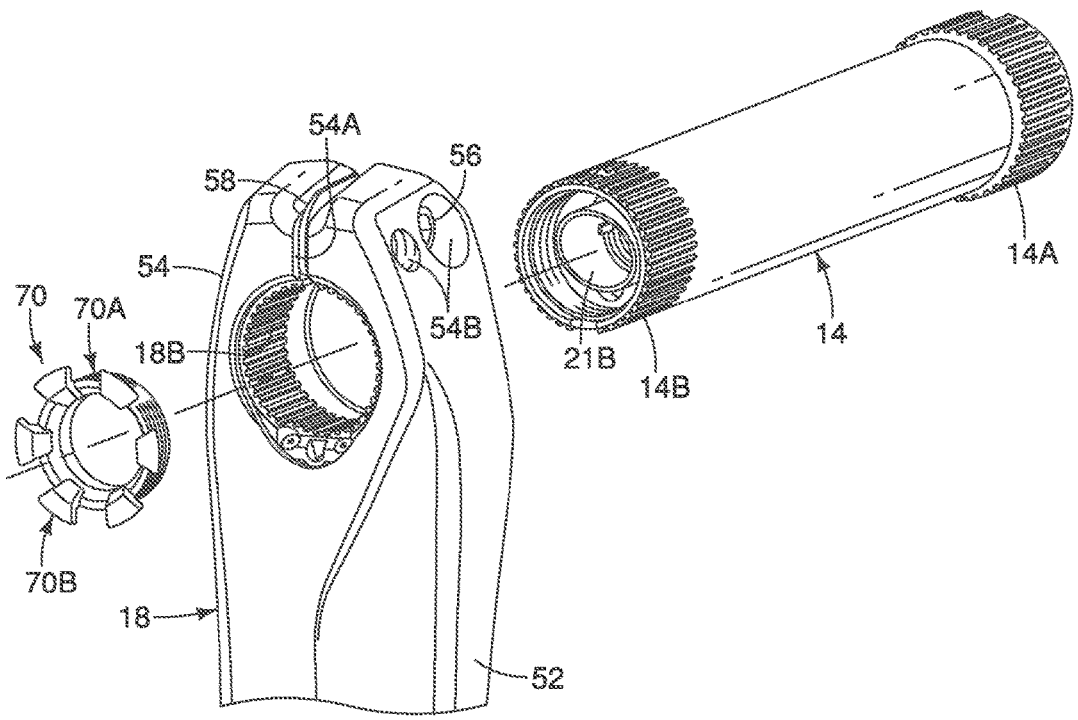
FIG. 14 is an outside perspective view, similar to FIGS. 11 to 13, of the crankshaft mounting portion of the left crank arm and the crankshaft with the crankshaft detached from the left crank arm.
Figure 15:
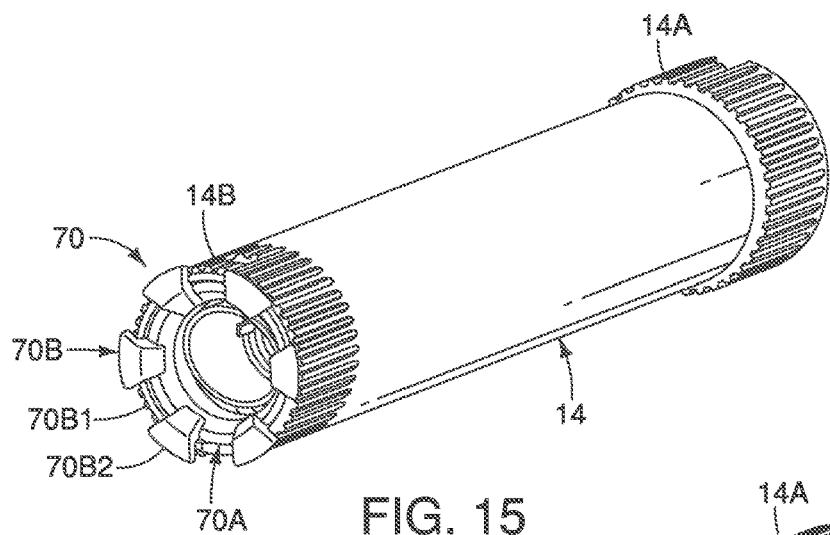
FIG. 15 is a perspective view of the crankshaft and the crank arm fixing ring attached to the crankshaft.
Figure 16:
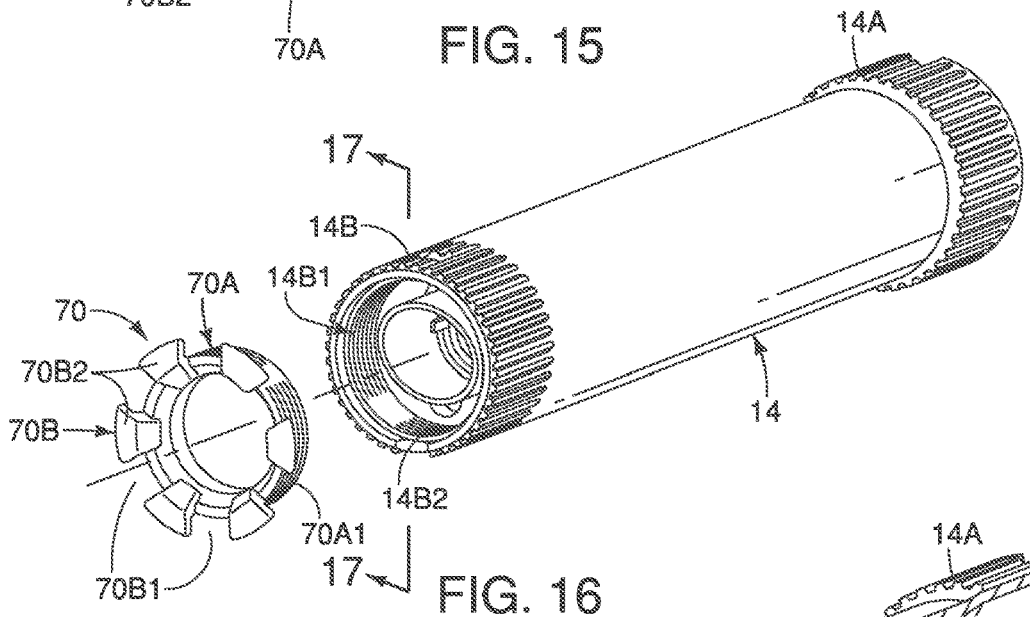
FIG. 16 is a perspective view of the crankshaft and the crank arm fixing ring detached from the crankshaft.
Figure 17:
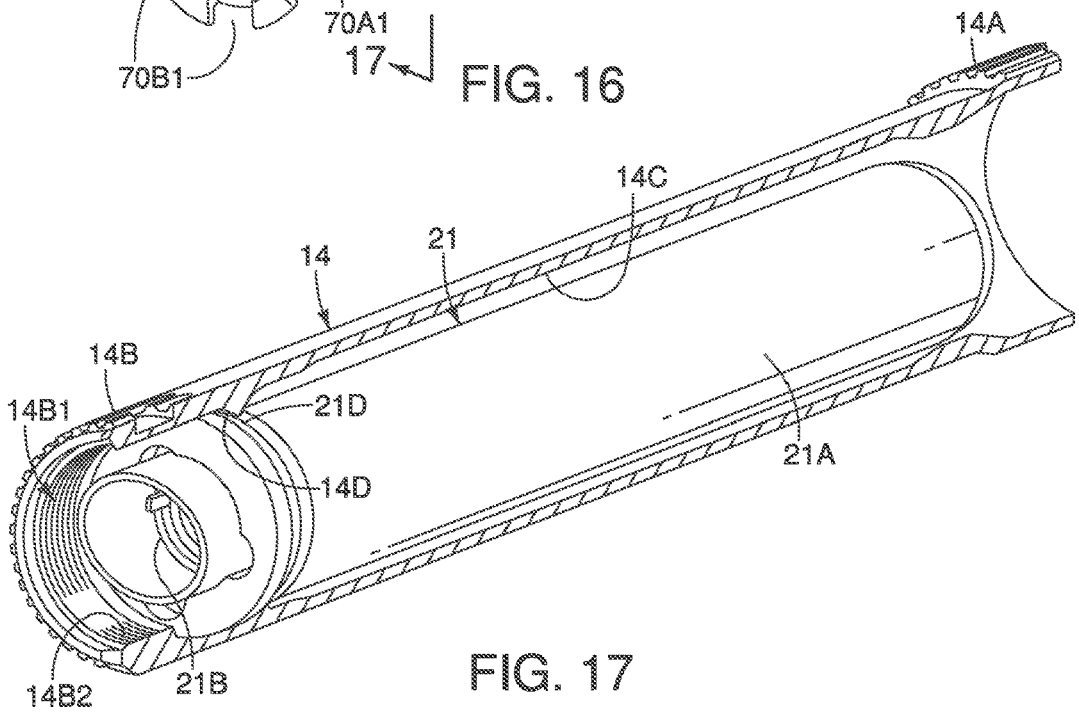
FIG. 17 is a longitudinal cross-sectional view of the crankshaft and the battery unit disposed in the crankshaft as seen along section line 17-17 of FIG. 16.

In the first embodiment, as shown in FIGS. 2, 3 and 5, the first crank arm 16 is provided with a wireless communication unit 20 that is configured to transmit data signals to a cycle computer CC as explained below. Here, in the first embodiment, the wireless communication unit 20 is detachably installed on the first crank arm 16. As explained below, the wireless communication unit 20 provides pedaling force data and cadence data to the cycle computer CC (FIGS. 1 and 7). The cycle computer CC can then provide the rider with various information on a current riding condition.

Also in the first embodiment, as shown in FIGS. 4 and 7, the bicycle crank assembly 12 further comprises a first electrical unit 21. Here, the crankshaft 14 is a hollow shaft that houses the first electrical unit 21. In the first embodiment, the first electrical unit 21 preferably includes an electrical power source 21A. (e.g., a battery, capacitor, etc.), an electrical connector 21B, a housing 21C and a transmission line W4. The housing is a cylindrical member which accommodates the electrical power source 21A and the transmission line W4. The transmission line W4 electrically connects between the transmission line W2 and the transmission line W3. The first electrical unit 21 is disposed in the interior space 14C of the crankshaft 14. The electrical power source 21A can be, for example, a rechargeable dry cell battery. Alternatively, power for the electrical components of the bicycle crank assembly 12 can also be provided by one or more solar cells that are affixed to the bicycle crank assembly 12. Alternatively, power for the electrical components of the bicycle crank assembly 12 can be generated from piezoelectric devices or any combination of batteries, solar cells, piezoelectric devices, and other suitable power sources.

Also in the first embodiment, as shown in FIGS. 2 to 4 and 6, the bicycle crank assembly 12 further comprises a second electrical unit 22. The second electrical unit 22 is disposed on the second crank arm 18. Further in the first embodiment, as shown in FIGS. 4 and 3, the bicycle crank assembly 12 further comprises a third electrical unit 23. The third electrical unit 23 is disposed on the first crank arm 16. The wireless communication unit 20 is electrically connected to the third electrical unit 23 by a transmission line W1, while the first electrical unit 21 is electrically connected to the third electrical unit 23 by a transmission line W2. Also, the first electrical unit 21 is electrically connected to the second electrical unit 22 by a transmission line W3. In this way, the first electrical unit 21 supplies electrical power to the wireless communication unit 20 and the second and third electrical units 22 and 23. While the transmission lines W1 to W3 are electrical cords that each includes at least two electrical conductors (a ground wire and a voltage wire) in the first embodiment, the transmission lines W1 to W3 are not limited to that configuration. Rather, optical lines, signal lines and/or electrical conductors can be used for the transmission lines W1 to W3.

Here, in the first embodiment, the second and third electrical units 22 and 23 are configured as pedaling force detectors. In other words, the second electrical unit 22 constitutes a pedaling force detector that detects a pedaling force applied to the second crank arm 18, while the third electrical unit 23 constitutes a pedaling force detector that detects a pedaling force applied to the first crank arm 16. The second electrical unit 22 provides pedaling force information to the wireless communication unit 20 via the first electrical unit 21 and the third electrical unit 23. The third electrical unit 23 provides pedaling force information to the wireless communication unit 20 directly. Then the wireless communication unit 20 wirelessly communicates with the cycle computer CC so that the pedaling force information can be conveyed to a rider via the cycle computer CC.

In the illustrated embodiment, the electrical power is supplied from the first electrical unit 21 to the wireless communication unit 20 and the second and third electrical units 22 and 23 via power lines (i.e., the transmission lines W1 to W3). Furthermore, the wireless communication unit 20 can receive information signals from the first, second and third electrical units 21, 22 and 23 via electrical communication lines (i.e., the transmission lines W1 to W3). In the illustrated embodiment, the transmission lines W1 to W3 include at least four electrical conductors for transmit power and signal separately. The transmission lines W1 to W3 have separate signal lines that can be provided for transmitting data in addition to a ground wire and a voltage wire.

Also, power line communication technology can be used for communicating between the wireless communication unit 20 and the second electrical unit 22 via the first electrical unit 21 and the third electrical unit 23, and between the wireless communication unit 20 and the third electrical unit 23, if needed and/or desired. Basically, power line communication (PLC) carries data on an electrical conductor or transmission line that is also used simultaneously for electrical power transmission or electrical power distribution to the electrical components (e.g., the wireless communication unit 20 and the first, second and third electrical units 21, 22 and 23). The PLC technology uses unique identifying information such as a unique identifier that is assigned to each of the electrical components (i.e., the wireless communication unit 20 and the first, second and third electrical units 21, 22 and 23). Each of the electrical components (i.e., the wireless communication unit 20 and the first, second and third electrical units 21, 22 and 23) includes a memory in which the unique identifying information is stored. Based on the unique identifying information, each of the electrical components can recognize, information signals which are necessary for itself among information signals transmitted via the transmission (electrical communication) lines W1 to W3.

In the first embodiment, the first crank arm 16 is non-removably attached to the first end portion 14A of the crankshaft 14, while the second crank arm 18 is removably attached to the second end portion 14B of the crankshaft 14. Thus, the transmission line W3 preferably includes an electrical connector EC1 that electrically connects to an electrical connector 21B of the first electrical unit 21. Here, the electrical connector EC1 and the electrical connector 21B mate together with a snap-fit connection therebetween so that the transmission line W3 can be easily connected, disconnected and reconnected. As a result, when the second crank arm 18 is to be detached from the second end portion 14B of the crankshaft 14, the electrical connector EC1 is first disconnected from the electrical connector 21B of the first electrical unit 21. Also, with this arrangement, the first and third electrical units 21 and 23 can be electrically connected by the transmission line W2 without using electrical connectors. In other words, the transmission line W2 can be permanently attached (i.e., hardwired) to the first and third electrical units 21 and 23 since the first crank arm 16 is non-removably attached to the crankshaft 14. The transmission line W2 can be connected to the first electrical unit 21 via a connector to detach the first electrical unit 21 from the crankshaft 14. One end of the transmission line W1 is electrically connected to the third electrical unit 23 without using electrical connectors (i.e., hardwired). Preferably, the other end of the transmission line W1 has an electrical connector EC2 (FIG. 7) that mates with an electrical connector EC3 (FIG. 3) of the wireless communication unit 20 so that the wireless communication unit 20 can be easily disconnected from the first crank arm 16. In the case that the wireless communication unit 20 is stably fixed on the first crank arm 16, the other end of the transmission line W1 can be permanently attached (i.e., hardwired) to the third electrical units 23.

Referring now to FIG. 7, a block diagram of the bicycle crank assembly 12 is illustrated. In the first embodiment, the cycle computer CC comprises at least one-way wireless communicator 24 (i.e., a wireless receiver-wireless transmitter that uses wireless technology such as ultra wide band communications, ANT communications, ANT+ communications or Bluetooth communications) and a controller 26. The controller 26 is a microcomputer that includes a central processing unit (CPU) or processor and other conventional components such as an input interface circuit, an output interface circuit, and storage devices such as ROM (Read Only Memory) device and RAM (Random Access Memory) device. Typically, the cycle computer CC includes a user interface 27, a display 28 and a speaker 30. Also, the controller 26 is programmed to display the pedaling force information on the display 28. The controller 26 can include other programs as needed and/or desired. For example, the controller 26 can include an automatic shifting program for automatically shifting gears of the bicycle 10 based on the pedaling force information and/or other bicycle riding conditions that are detected with other sensors (not shown).

Still referring to FIG. 7, preferably, the cycle computer CC includes other conventional parts such as a replaceable battery (not shown). While the wireless communicator 24 and the controller 26 are illustrated as a part of the cycle computer CC, the wireless communicator 24 and the controller 26 can be provided separately from the cycle computer CC. For example, alternatively, the wireless communicator 24 can be connected to the cycle computer CC by one or more communication cords. It will be apparent to those skilled in the art from this disclosure that many types of wireless communicator 24 can be used for receiving the pedaling force information. Thus, the cycle computer CC will not be discussed and/or illustrated in detail herein.

Basically, as seen in FIG. 7, the wireless communication unit 20 includes a wireless communicator 32. The wireless communicator 32 includes a wireless receiver-wireless transmitter that uses wireless technology such as ultra wide band communications, ANT communications, ANT+ communications or Bluetooth communications to communicate with the wireless communicator 24 of the cycle computer CC.

Basically, as seen in FIG. 7, the second electrical unit 22 basically includes a sensor circuit 34 and a plurality of strain sensors 36 for measuring the pedaling force applied to the second crank arm 18. The third electrical unit 23 basically includes a cadence sensor 31, a sensor circuit 38 and a plurality of second strain sensors 40 for measuring the pedaling force applied to the first crank arm 16. The cadence sensor 31 (e.g., a reed switch) detects a magnetic field of a magnet M that is attached to the bicycle 10. Alternatively, the cadence sensor 31 can be mounted at any suitable location to detect the magnetic field of the magnet M. The cadence sensor 31 is electrically connected to the wireless communicator 32. The wireless communicator 32 is configured to wirelessly output cadence information received from the cadence sensor 31 to the cycle computer CC. The cadence sensor 31 can be disposed on the wireless communication unit 20 instead of being disposed on the sensor circuit 38. The wireless communication unit 20 is electrically connected to the sensor circuits 38 and 34 for receiving signals indicative of the pedaling force applied to the first and second crank arms 16 and 18. In this way, the second and third electrical units 22 and 23 are in wireless communication with the cycle computer CC via the wireless communicator 32 of the wireless communication unit 20 to provide pedaling force information to the rider.

In the first embodiment, the sensor circuit 34 is mounted on the second crank arm 18. The sensor circuit 34 is electrically connected to the strain sensors 36 that are also mounted on the second crank arm 18. The wireless communicator 32 is electrically connected to the sensor circuit 34 via the transmission lines W1 to W3 and the first electrical unit 21 to provide data from the sensor circuit 34 to the wireless communicator 32 via power line communications as mentioned above. The sensor circuit 34 includes an amplifier circuit 34A that amplifies a strain signal received from and detected by the strain sensors 36. The sensor circuit 34 further includes an A/D converter circuit 34B that transforms the strain signal into a data signal indicative of the pedaling force applied to the second crank arm 18. In other words, the sensor circuit 34 interprets the strain signal(s) to generate pedaling force information that is transmitted to the cycle computer CC via the wireless communicator 32.

Similarly, the sensor circuit 38 is mounted on the first crank arm 16. The sensor circuit 38 is electrically connected to the strain sensors 40 that are also mounted on the first crank arm 16. The wireless communicator 32 is electrically connected to the sensor circuit 38 via the transmission line W1 to provide data from the sensor circuit 38 to the wireless communicator 32. The sensor circuit 38 includes an amplifier circuit 38A and an A/D converter circuit 38B. The amplifier circuit 38A amplifies a strain signal received from and detected by the strain sensors 40, and the A/D converter circuit 38B then transforms the strain signal into a data signal indicative of the pedaling force applied to the first crank arm 15. In other words, the sensor circuit 38 interprets the strain signal(s) to generate pedaling force information that is transmitted to the cycle computer CC via the wireless communicator 32.

In particular, as shown in FIG. 7, the sensor circuit 38 further includes a calculation circuit 38C. The calculation circuit 38C has a processor that analyze the data signals received from the A/D converter circuits 34B and 38B. The calculation circuit 38C calculates a pedaling force or power inputted to each of the first and second crank arms 16 and 18. In the case that the calculation circuit 38C calculates power, the calculation circuit 38C uses not only the data signal from the A/D converter circuits 34B and 38B but also cadence information from the cadence sensor 31. The calculated pedaling forces are then transmitted to the wireless communicator 32 of the wireless communication unit 20.

Referring now to FIGS. 3 to 5, the first (additional) crank arm 16 includes a crank portion 42 and a sprocket mounting portion 44. The crank portion 42 of the first crank arm 16 includes the threaded opening 16B for threadedly receiving one of the bicycle pedals P (FIG. 1). The first crank arm 16 has an internal cavity 16A. In the illustrated embodiment, the sensor circuit 38 and the strain sensors 40 are mounted on the crank portion 42 of the first bicycle crank arm 16. The transmission lines W1 and W2 extend from the crankshaft receiving opening 16A into the internal cavity 16C via a bore 16D. The transmission lines W1 and W2 extend out of the internal cavity 16C through an opening 16E (FIG. 4), and are each electrically connected to the sensor circuit 38.

The sprocket mounting portion 44 of the first crank arm 16 includes the crankshaft receiving opening 16A for receiving the crankshaft 14. The sprocket mounting portion 44 of the first (additional) crank arm 16 further includes a sprocket mounting structure 51. The sprocket mounting structure 51 includes a plurality of sprocket mounting arms defining a spider portion of the first crank arm 16. Each of the sprocket mounting arms of the sprocket mounting structure 51 has a distal end part 51A. Each of the distal end parts 51A has a sprocket mounting hole 51B. In the first embodiment, the sprocket mounting structure 51 includes a plurality of sprocket mounting arms defining a spider portion of the first crank arm 16. The wireless communication unit 20 is disposed on two of the sprocket mounting arms. The bicycle sprockets S1 and S2 are mounted on the distal end parts 51A. The sprocket mounting holes 51B are configured to receive securing devices (e.g., ring nuts and ring bolts) to fixedly mount the bicycle sprockets S1 and S2 to the sprocket mounting structure 51 in a conventional manner. Thus, the sprocket mounting structure 51 has at least one sprocket mounted on the sprocket mounting structure 51. The transmission line W3 extends into the internal cavity 18C of the second crank arm 18.

Referring now to FIGS. 4 and 6 to 10, the second crank arm 18 includes a crank portion 52 and a mounting portion 54. The crank portion 52 of the second crank arm 18 includes the threaded opening 18B for threadedly receiving one of the bicycle pedals P (FIG. 1). The mounting portion 54 of the second crank arm 18 includes the crankshaft receiving opening 18A. Here, the crankshaft receiving opening 18A includes a plurality of axially extending splines that mates with a plurality of axially extending splines of the second end portion 14B of the crankshaft 14. The mounting portion 54 has a radial slit 54A that extends in a radial direction from the crankshaft receiving opening 18A. The mounting portion 54 also has a pair of partially threaded bores 54B extending across the radial slit 54A. The mounting portion 54 has two fasteners 56 that are screwed into the partially threaded bores 54B to clamp the mounting portion 54 of the second crank arm 18 on the second end portion 14B of the crankshaft 14. A plate 58 is disposed on the radial slit 54. The plate 58 has two through holes which the fasteners 56 through in and protrusion 58A which is disposed in a recess 14C on outer surface of the second end portion 14B of the crankshaft 14.

In the illustrated embodiment, the sensor circuit 34 and the strain sensors 36 are mounted on the crank portion 52 of the second crank arm 18. The second crank arm 18 has an internal cavity 18C. More specifically, the internal cavity 18C extends longitudinally along the crank portion 52 of the second crank arm 18. Also, the second crank arm 18 has a bore 18D that extends from the internal cavity 18C to the crankshaft receiving opening 18A. The transmission line W3 extends through the bore 18D. In this way, the transmission line W3 extends from the crankshaft receiving opening 18A into the internal cavity 18C via the bore 18D. The transmission line W3 extends out of the internal cavity 18C through an opening 18E (FIG. 4), and is electrically connected to the sensor circuit 34. The second crank arm 18 has a seal retainer 74 and a seal 76 for sealing the interfaces between the bore 18D and the portion of the transmission line W3 extending through the bore 18D.

In the first embodiment, the wireless communication unit 20 includes a housing 60 that encloses the wireless communicator 32 and other electrical components as needed and/or desired. The housing 60 is preferably made of a material, such as plastic. As seen in FIG. 3, the housing 60 is provided with a switch SW and an indicator light LED that are disposed on an external surface of the housing 60. The housing 60 is also preferably provided with a charge receiver port PT. In the illustrated embodiment, the switch SW, the indicator light LED and the charge receiver port PT are all electrically connected to a printed circuit board that is electrically connected to the wireless communicator 32. The switch SW can be used to calibrate the sensor circuits 34 and 38 using a calibration circuit of the printed circuit board and/or pairing with the cycle computer CC. The indicator light LED can be any light source, preferably a light emitting diode. The indicator light LED can use color codes to indicate various operating conditions of the wireless communication unit 20. For example, the indicator light LED can flash on and off during calibration of the sensor circuits 34 and 38 via the switch SW. Preferably, the indicator light LED is electrically connected to the electrical power source 21A for indicating the power level of the electrical power source 21A. The processor, memory and the circuitry for controlling the indicator light LED can also be provided on the printed circuit board of the wireless communication unit 20. When the indicator light LED indicates a low power level for the electrical power source 21A, the rider may easily charge the electrical components of the wireless communication unit 20 via the charge receiver port PT. The charge receiver port PT receives a charger component for the wireless communication unit 20.

The second electrical unit 22 includes a housing 22A that encloses the sensor circuit 34 and the strain sensors 36. The housing 22A is disposed on the inside surface facing the bicycle frame F in a state where the crank assembly 12 is mounted on the bicycle 10. The housing 22A is fixed to the inside surface of the second crank arm 18 by adhesive. The second electrical unit 22 is preferably made of a material, such as plastic. The third electrical unit 23 includes a housing 23A that encloses the first circuit 38 and the strain sensor 40. The housing 23A is disposed on the inside surface facing the bicycle frame F in a state where the crank assembly is mounted on the bicycle 10. The housing 23A is fixed to the inside surface of the first crank arm 16 by adhesive. The third electrical unit 23 is preferably made of a material, such as plastic, that allows magnetic flux to pass therethrough to activate the cadence sensor 31 during the pedaling of the first and second crank arms 16 and 18.

As best seen in FIG. 3, the wireless communication unit 20 further includes a first attachment part 62. As shown, the first attachment part 62 is a flange extending from one circumferential side of the housing 60. The wireless communication unit 20 further includes a second attachment part 64, which is also a flange, extending from a circumferential side of the housing 60 that is opposite from the first attachment part 62. The first and second attachment parts 62 and 64 serve to fixedly secure the wireless communication unit 20 to the sprocket mounting portion 44. Specifically, as seen in FIG. 3, two adjacent sprocket mounting arms of the sprocket mounting structure 51 have recesses that are configured to receive the first and second attachment parts 62 and 64. The first attachment part 62 has a fastener opening 66 for receiving a fastener 68 therethrough. The first attachment part 62 of the wireless communication unit 20 is fixed to the sprocket mounting structure 51 by the fastener 68. Optionally, although not shown, the second attachment part 64 of the wireless communication unit 20 can include a fastener opening (not shown) to fixedly secure the second attachment part 64 to the sprocket mounting structure 51. The first and second attachment parts 62 and 64 can be omitted and the housing 60 can be mounted on the portion between the two spider portions by a fixing member, e.g. bolts directly.

In the first embodiment, one end of the transmission line W1 is connected to an electrical connector that is wired to the printed circuit board of the wireless communication unit 20. The transmission line W1 extends from the wireless communication unit 20 and through one of the sprocket mounting arms of the sprocket mounting structure 51 to the crankshaft receiving opening 16A. Then, the transmission line W1 extends through the first crank arm 16 and is then directly connected to the printed circuit board of the sensor circuit 38. The transmission line W2 has one end directly connected to the printed circuit board of the sensor circuit 38 and the other end directly connected to the first electrical unit 21, which in turn is electrically connected to the sensor circuit 34 via the transmission line W3. Thus, the first electrical unit 21 and the transmission lines W1 to W3 transmit pedaling force information between the wireless communication unit 20 and the sensor circuits 34 and 38.

Now referring to FIGS. 10 to 16, the bicycle crank assembly 12 further comprises a crank arm fixing ring 70. The crank arm fixing ring 70 secures the second crank arm 18 to the second end portion 14B of the crankshaft 14. The second end portion 14B has an opening 14B1 with an internal thread 14B2. The interior space 14C of the crankshaft 14 communicates with the opening 14B1. A radial end of the electrical connector 21B has a protrusion 21D which contact to a protrusion 14D on an inner surface of the crankshaft 14. A fixing member 71 is disposed in the crank shaft 14 and pushes the first electrical unit 21 such as the protrusion 21D contact to the protrusion 14D. A seal member 73 disposed between the fixing member 71 and the protrusion 21D and contacts with inner surface of the crankshaft 14. The fixing member 71 is fixed on the crankshaft 14 by a snap-fit manner. The fixing member 71 can be fixed on the crankshaft 14 by using the internal thread 14B2.

The crank arm fixing ring 70 comprises a cylindrical mounting portion 70A and a contact portion 70B. The cylindrical mounting portion 70A and the contact portion 70B are integrally formed as a one-piece member. The cylindrical mounting portion 70A and the contact portion 70B are made of a metallic material. Alternatively, the cylindrical mounting portion 70A and the contact portion 70B are made of a non-metallic material.

The cylindrical mounting portion 70A includes an external thread 70A1 that is configured to screw into the crankshaft 14. More specifically, the external thread 70A1 is screwed into the internal thread 14B2 of the crankshaft 14.

The contact portion 70B extends radially outwardly from the cylindrical mounting portion 70A. The contact portion 70B is configured to contact the second crank arm 18 upon attachment of the second crank arm 18 with the crank arm fixing ring 70. The contact portion 70B contacts the second crank arm 18. The contact portion 70B includes at least one cutout 70B1 that extends radially outwardly from the cylindrical mounting portion 70A. Here, the at least one cutout of the contact portion 70B includes a plurality of the cutouts 70B1. However, the contact portion 70B can have only one of the cutouts 70B1. Moreover, while the contact portion 70B has six of the cutouts 70B1 in the first embodiment, the contact portion 70B can have fewer or more of the cutouts 70B1 as needed and/or desired. The at least one cutout 70B1 is configured to receive the transmission line W3 which extends through the cylindrical mounting portion 70A.

In the first embodiment, the cutouts 70B1 are arranged to define a plurality of tool engagement protrusions 70B2. Preferably, as shown, at least two of the tool engagement protrusions 70B2 are diametrically disposed. In the first embodiment, the tool engagement protrusions 70B2 are equally spaced apart in a circumferential direction.

As mentioned above, the first electrical unit 21 is electrically connected to the second electrical unit 22 by the transmission line W3. The transmission line W3 extends into the cylindrical mounting portion 70A of the crank arm fixing ring 70 and out of the cylindrical mounting portion 70A of the crank arm fixing ring 70 via the at least one cutout 70B1.

The bicycle crank assembly 12 further comprises an outer cap 72 disposed in the crankshaft receiving opening 18A and concealing the crank arm fixing ring 70 and the portion of the transmission line W3 that extends out of the bore 18D and into an area of the crankshaft receiving opening 18A. The outer cap 72 is detachably fixed on the crank arm fixing ring 70 by using snap-fit structure. The outer cap 72 has a plurality of pawls 72A to engage the crank arm fixing ring 70. The cylindrical mounting portion 70A of the crank arm fixing ring 70 has one or more recesses to be engaged with the pawls 72A of the outer cap 72.

Figure 18:
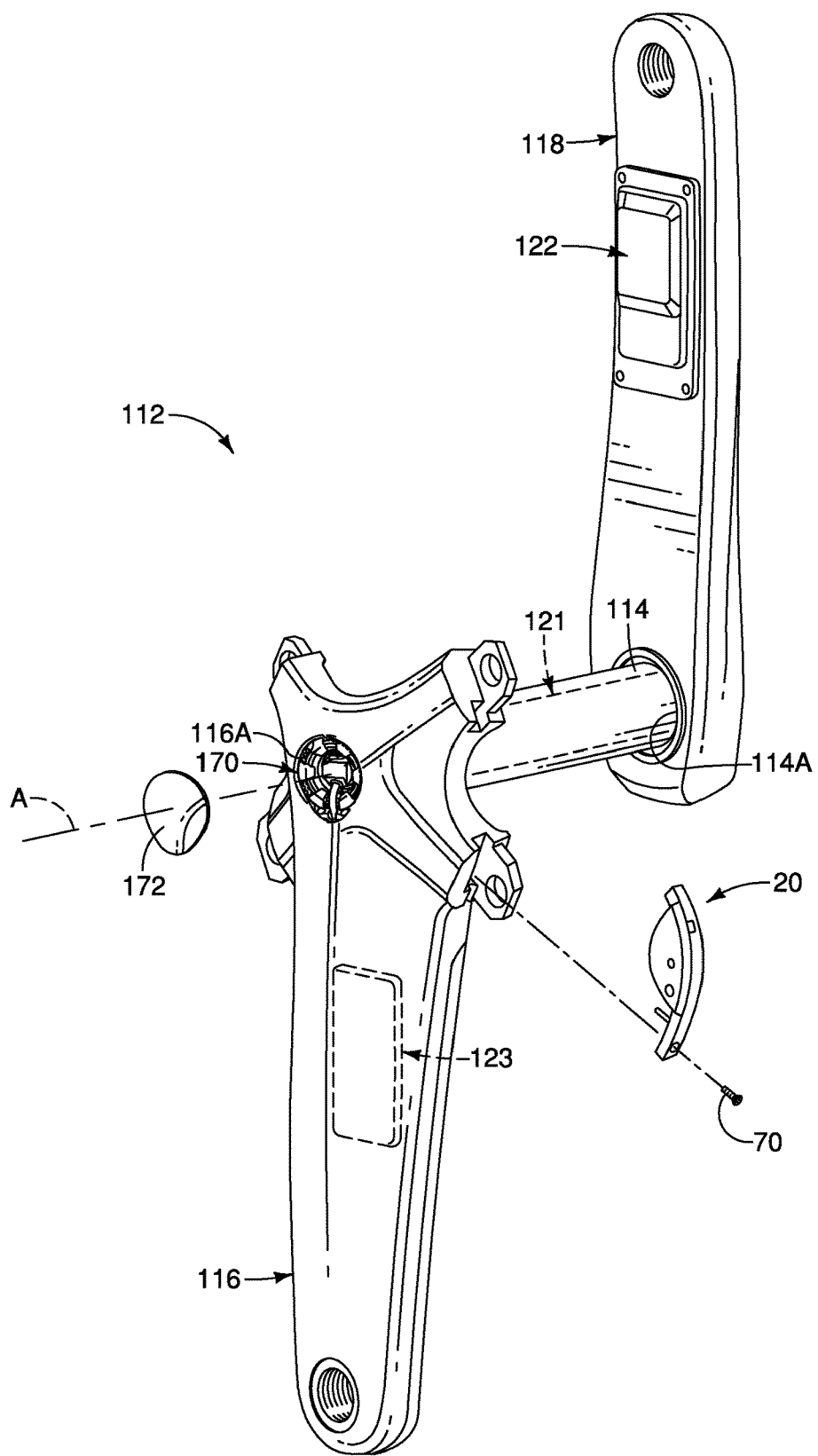
FIG. 18 is a perspective view of a bicycle crank assembly in accordance with a second illustrated embodiment.
Figure 19:
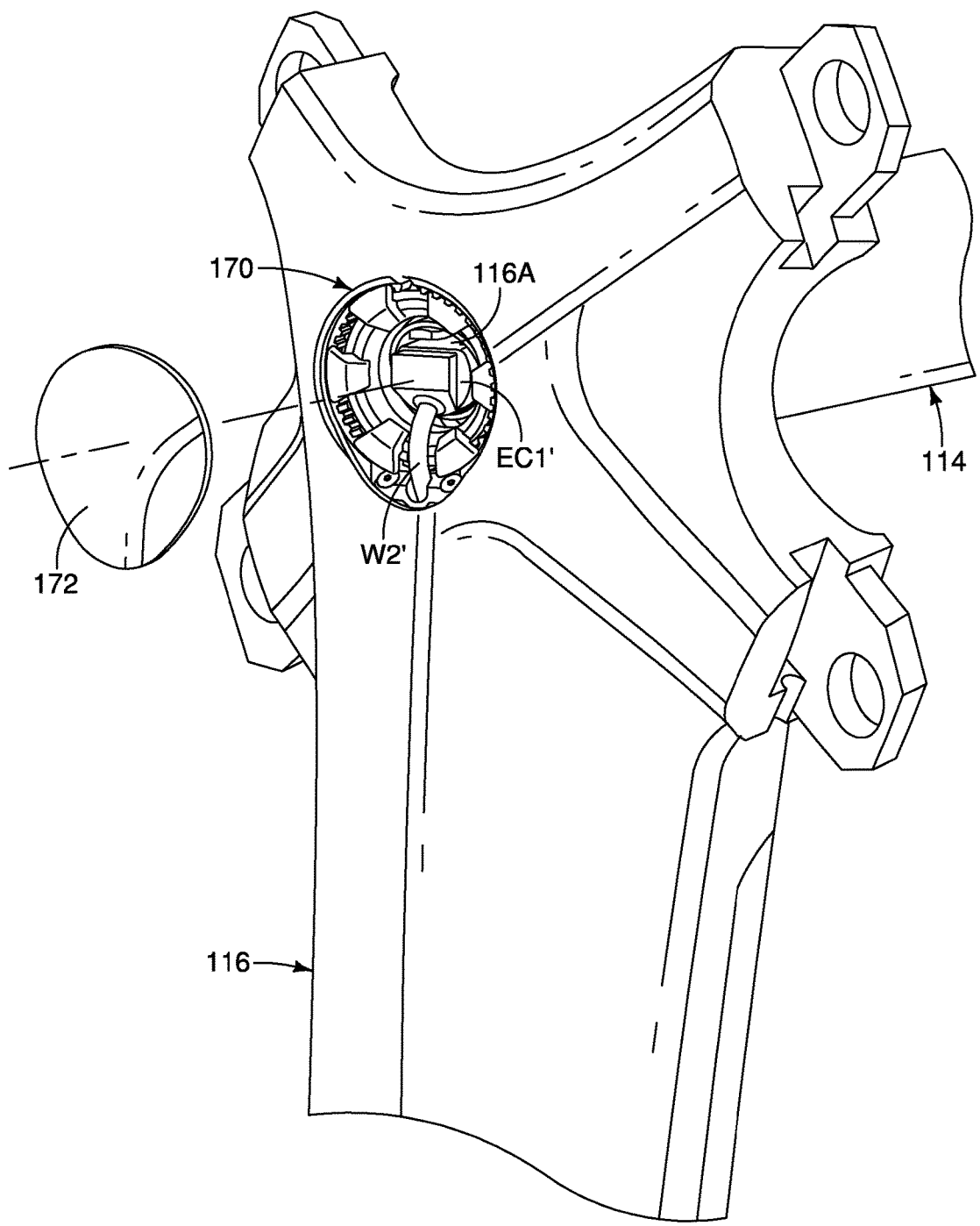
FIG. 19 is an outside perspective view of a crankshaft mounting portion of the right crank arm and the crankshaft with an outer cap removed to reveal the crankshaft attached to the right crank arm by a crank arm fixing ring.

Referring now to FIGS. 18 and 19, an alternative bicycle crank assembly 112 is illustrated. The bicycle crank assembly 112 basically includes a crankshaft 114, a right or first crank arm 116 and a left or second crank arm 118. In FIGS. 18 and 19, the bicycle crank assembly 112 is identical to the bicycle crank assembly 12 discussed above, except that the crankshaft 114, the first crank arm 116 and the second crank arm 118 have been configured such that the first crank arm 116 is detachably attached to the crankshaft 114 and the second crank arm 118 is non-detachably attached to the crankshaft 114. The bicycle crank assembly 112 further includes a first electrical unit 121, a second electrical unit 122 and a third electrical unit 123, which are identical to the first, second and third electrical units 21, 22 and 23. The wireless communication unit 20 of the first embodiment is mounted on the first crank arm 116 in the same way that the wireless communication unit 20 is mounted on the first crank arm 16.

The first crank arm 116 has a crankshaft receiving opening 116A which non-rotatably mates with the first end portion of the crankshaft 114. For example, as shown, the crankshaft receiving opening 116A has a plurality of axially extending splines that mates with a plurality of axially extending splines of the first end portion of the crankshaft 114. The bicycle crank assembly 112 further comprises a crank arm fixing ring 170 that is used to secure the first crank arm 116 to the first end portion of the crankshaft 114 in the same way that the second crank arm 18 is secured to the second end portion 14B of the crankshaft 14 in the first embodiment. The bicycle crank assembly 112 further comprises an outer cap 172 disposed in the crankshaft receiving opening 116A to conceal the crank arm fixing ring 170 and a portion of a transmission line W2' that extends into an area of the crankshaft receiving opening 116A.

The second crank arm 118 includes a crankshaft receiving opening 118A with the second end portion of the crankshaft 114 disposed in the crankshaft receiving opening 118A. The crankshaft receiving opening 118A non-rotatably mates with the second end portion of the crankshaft 114. For example, as shown, the crankshaft receiving opening 118A has a plurality of axially extending splines that mates with a plurality of axially extending splines of the second end portion of the crankshaft 114. The second crank arm 118 is non-removably attached to the second end portion of the crankshaft 114 in the same way that the first crank arm 16 is secured to the first end portion 14A of the crankshaft 14 in the first embodiment.

With this attachment arrangement of the first and second crank arms 116 and 118 to the crankshaft 114, the first electrical unit 121 is flipped, and the third electrical unit 123 is electrically connected to the first electrical unit 121 by the transmission line W2' that has an electrical connector EC1'. On the other hand, with this attachment arrangement, the first electrical unit 121 can be hardwired to the second electrical unit 122 similar to the electrical connection between the first electrical unit 21 and the third electrical unit 23 using the transmission line W2 of the first embodiment.

In view of the similarity between the bicycle crank assembly 12 and the bicycle crank assembly 112, for the sake of brevity, the bicycle crank assembly 112 will not be discussed in further detail herein.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top". "bottom", "side", "vertical", "horizontal", "perpendicular" and "transverse" as well as any other similar directional terms refer to those directions of a bicycle in an upright, riding position and equipped with the bicycle crank assembly. Accordingly, these directional terms, as utilized to describe the bicycle crank assembly should be interpreted relative to a bicycle in an upright riding position on a horizontal surface and that is equipped with the bicycle crank assembly. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that, the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically gated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A crank arm fixing ring comprising:
a cylindrical mounting portion including an external thread configured to screw into a crankshaft, the cylindrical mounting portion having a first end and a second end; and
a contact portion including at least one tool engagement protrusion extending axially from the second end of the cylindrical mounting portion and extending radially outwardly with respect to the second end of the cylindrical mounting portion, the at least one tool engagement protrusion being configured to contact a crank arm upon attachment of the crank arm with the crank arm fixing ring, the contact portion including at least one cutout extending axially and radially outwardly from the second end of the cylindrical mounting portion and configured to receive a transmission line extending through the cylindrical mounting portion.

2. The crank arm fixing ring according to claim 1, wherein the at least one cutout of the contact portion includes a plurality of the cutouts.

3. The crank arm fixing ring according to claim 2, wherein the at least one tool engagement protrusion includes a plurality of tool engagement protrusions and the cutouts are arranged to define the plurality of tool engagement protrusions.

4. The crank arm fixing ring according to claim 3, wherein the tool engagement protrusions are equally spaced apart in a circumferential direction.

5. The crank arm fixing ring according to claim 3, wherein at least two of the tool engagement protrusions are diametrically disposed.

6. The crank arm fixing ring according to claim 1, wherein the cylindrical mounting portion and the contact portion are integrally formed as a one-piece member.

7. The crank arm fixing ring according to claim 1, wherein the cylindrical mounting portion and the contact portion are made of a metallic material.

8. The crank arm fixing ring according to claim 1, wherein the cylindrical mounting portion and the contact portion are made of a non-metallic material.

9. A bicycle crank assembly comprising:
a crankshaft having a first end portion and a second end portion, the second end portion having an opening with an internal thread, the opening leading to an interior space of the crankshaft;
a crank arm including a crankshaft receiving opening with the second end portion of the crankshaft disposed in the crankshaft receiving opening;

a crank arm fixing ring securing the crank arm to the second end portion of the crankshaft, the crank arm fixing ring comprising:
- a cylindrical mounting portion including an external thread screwed into the internal thread of the crankshaft; and
- a contact portion contacting the crank arm, the contact portion including at least one cutout extending radially outwardly from the cylindrical mounting portion; and a transmission line extending into the cylindrical mounting portion of the crank arm fixing ring and out of the cylindrical mounting portion of the crank arm fixing ring via the at least one cutout.

10. The bicycle crank assembly according to claim 9, further comprising
- a first electrical unit disposed in the interior space of the crankshaft; and
- a second electrical unit disposed on the crank arm, the first electrical unit being electrically connected to the second electrical unit by the transmission line.

11. The bicycle crank assembly according to claim 10, wherein
the crank arm has an internal cavity and the transmission line extends into the internal cavity of the crank arm.

12. The bicycle crank assembly according to claim 11, wherein
the crank arm has a bore extending from the internal cavity to the crankshaft receiving opening, the transmission line extends through the bore.

13. The bicycle crank assembly according to claim 12, further comprising
an outer cap disposed in the crankshaft receiving opening and concealing the crank arm fixing ring and a portion of the transmission line extending out of the bore and into an area of the crankshaft receiving opening.

14. The bicycle crank assembly according to claim 9, further comprising
an additional crank arm secured to the first end portion of the crankshaft.

15. The bicycle crank assembly according to claim 14, wherein
the additional crank arm includes a sprocket mounting structure with at least one sprocket mounted on the sprocket mounting structure.

16. The bicycle crank assembly according to claim 9, wherein
the at least one cutout of the contact portion includes a plurality of the cutouts.

17. The bicycle crank assembly according to claim 16, wherein
the cutouts are arranged to define a plurality of tool engagement protrusions.

18. The bicycle crank assembly according to claim 17, wherein
the tool engagement protrusions are equally spaced apart in a circumferential direction.

19. The bicycle crank assembly according to claim 1, wherein
the cylindrical mounting portion and the contact portion are integrally formed as a one-piece member.

* * * * *